(12) United States Patent
Hofmann

(10) Patent No.: US 11,014,162 B2
(45) Date of Patent: May 25, 2021

(54) DENDRITE-REINFORCED TITANIUM-BASED METAL MATRIX COMPOSITES

(71) Applicant: California Institute of Technology, Pasadena, CA (US)

(72) Inventor: Douglas C. Hofmann, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 157 days.

(21) Appl. No.: 15/991,854

(22) Filed: May 29, 2018

(65) Prior Publication Data

US 2018/0339342 A1 Nov. 29, 2018

Related U.S. Application Data

(60) Provisional application No. 62/511,668, filed on May 26, 2017.

(51) Int. Cl.
*B22F 3/105* (2006.01)
*C22C 14/00* (2006.01)
(Continued)

(52) U.S. Cl.
CPC .............. *B22F 10/00* (2021.01); *B33Y 10/00* (2014.12); *B33Y 70/00* (2014.12); *C22C 1/0458* (2013.01);
(Continued)

(58) Field of Classification Search
CPC .............. B22F 2301/40; B22F 2998/00; B22F 2999/00; B22F 3/008; B22F 3/1055;
(Continued)

(56) References Cited

U.S. PATENT DOCUMENTS

| 3,435,512 A | 4/1969 | Macrobbie |
| 3,529,457 A | 9/1970 | Bowers |

(Continued)

FOREIGN PATENT DOCUMENTS

| CN | 101709773 A | 5/2010 |
| CN | 102563006 A | 7/2012 |

(Continued)

OTHER PUBLICATIONS

Selective Laser Melting Additive Manufacturing of Ti-Based Nanocomposites: The Role of Nanopowder Dongdong Gu, Hongqiao Wang, and Guoquan Zhang Metallurgical and Materials Transactions p. 464-476, vol. 45A, Jan. 2014 (Year: 2014).*

(Continued)

*Primary Examiner* — Jenny R Wu
(74) *Attorney, Agent, or Firm* — KPPB LLP

(57) ABSTRACT

Ti-based metal matrix composites, methods of their additive manufacture, and parts manufactured therefrom and thereby are provided. Method include layer-by-layer additive manufacturing for fabricating Ti-based metal matrix composite parts thicker than 0.5 mm, in layers with thickness between 10-1000 micrometers. The parts formed may have one or more of the following properties: a tensile strength greater than 1 GPa, a fracture toughness greater than 40 MPa m$^{1/2}$, a yield strength divided by the density greater than 200 MPa cm$^3$/g, and a total strain to failure in a tension test greater than 5%.

23 Claims, 15 Drawing Sheets

(51) Int. Cl.
*B22F 10/00* (2021.01)
*B33Y 70/00* (2020.01)
*C22C 1/04* (2006.01)
*B33Y 10/00* (2015.01)

(52) U.S. Cl.
CPC .......... *C22C 14/00* (2013.01); *B22F 2301/40* (2013.01); *B22F 2998/00* (2013.01); *B22F 2999/00* (2013.01); *C22C 2200/04* (2013.01); *C22C 2202/00* (2013.01)

(58) Field of Classification Search
CPC ......... B33Y 10/00; B33Y 70/00; C22C 14/00; C22C 1/0458; C22C 2200/04; C22C 2202/00

See application file for complete search history.

(56) References Cited

U.S. PATENT DOCUMENTS

| | | |
|---|---|---|
| 3,682,606 A | 8/1972 | Anderson et al. |
| 3,986,412 A | 10/1976 | Farley et al. |
| RE29,989 E | 5/1979 | Polk |
| 4,173,393 A | 11/1979 | Maurer |
| 4,202,404 A | 5/1980 | Carlson |
| 4,670,636 A | 6/1987 | Taub et al. |
| 4,711,795 A | 12/1987 | Takeuchi et al. |
| 4,749,625 A | 6/1988 | Obayashi et al. |
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 5,168,918 A | 12/1992 | Okuda et al. |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0010409 A1 | 1/2003 | Kunze et al. |
| 2003/0052105 A1 | 3/2003 | Nagano et al. |
| 2003/0062811 A1 | 4/2003 | Peker et al. |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0263932 A1 | 12/2005 | Heugel |
| 2006/0105011 A1 | 5/2006 | Sun et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2007/0228592 A1 | 10/2007 | Dunn et al. |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2008/0190521 A1 | 8/2008 | Loffler et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0165339 A1 | 7/2011 | Skoglund et al. |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0133080 A1 | 5/2012 | Moussa et al. |
| 2013/0009338 A1 | 1/2013 | Mayer |
| 2013/0048152 A1 | 2/2013 | Na et al. |
| 2013/0062134 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0255837 A1 | 10/2013 | Peker et al. |
| 2013/0280547 A1 | 10/2013 | Brandl et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0332120 A1 | 11/2014 | Liu et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |

(56) References Cited

U.S. PATENT DOCUMENTS

| | | | |
|---|---|---|---|
| 2015/0044084 A1* | 2/2015 | Hofmann | C22C 38/08 419/7 |
| 2015/0047463 A1 | 2/2015 | Hofmann et al. | |
| 2015/0075744 A1 | 3/2015 | Hofmann et al. | |
| 2015/0158067 A1 | 6/2015 | Kumar et al. | |
| 2015/0219572 A1 | 8/2015 | Beuth, Jr. et al. | |
| 2015/0289605 A1 | 10/2015 | Prest et al. | |
| 2015/0299825 A1 | 10/2015 | Poole et al. | |
| 2015/0314566 A1 | 11/2015 | Mattlin et al. | |
| 2016/0023438 A1 | 1/2016 | Johnson et al. | |
| 2016/0175929 A1 | 6/2016 | Colin et al. | |
| 2016/0178047 A1 | 6/2016 | Kennett et al. | |
| 2016/0186850 A1* | 6/2016 | Hofmann | F16H 49/001 29/527.6 |
| 2016/0233089 A1 | 8/2016 | Zenou et al. | |
| 2016/0242877 A1* | 8/2016 | Bernhard | A61C 8/005 |
| 2016/0258522 A1 | 9/2016 | Hofmann et al. | |
| 2016/0263937 A1 | 9/2016 | Parness et al. | |
| 2016/0265576 A1 | 9/2016 | Hofmann et al. | |
| 2016/0299183 A1 | 11/2016 | Lee | |
| 2016/0361897 A1 | 12/2016 | Hofmann et al. | |
| 2017/0021417 A1 | 1/2017 | Martin et al. | |
| 2017/0121799 A1 | 5/2017 | Hofmann et al. | |
| 2017/0137955 A1 | 5/2017 | Hofmann et al. | |
| 2017/0226619 A1 | 8/2017 | Hofmann et al. | |
| 2018/0119259 A1 | 5/2018 | Hofmann et al. | |
| 2018/0339338 A1 | 11/2018 | Hofmann | |
| 2018/0345366 A1 | 12/2018 | Hofmann | |
| 2020/0000595 A1* | 1/2020 | Jones | A61F 2/4455 |

FOREIGN PATENT DOCUMENTS

| | | |
|---|---|---|
| CN | 103153502 A | 6/2013 |
| DE | 102009034566 A1 | 2/2011 |
| DE | 102010062089 A1 | 5/2012 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 2933044 A1 | 10/2015 |
| EP | 3630392 A1 | 4/2020 |
| EP | 3630395 A1 | 4/2020 |
| EP | 3630397 A2 | 4/2020 |
| JP | 61276762 A | 12/1986 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 2013238278 A | 11/2013 |
| JP | 2013544648 A | 12/2013 |
| KR | 1020200004435 A | 1/2020 |
| KR | 1020200011470 A | 2/2020 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2010027317 A1 | 3/2010 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Processing metallic glasses by selective laser melting Simon Pauly Materials Today, vol. 16 (Year: 2013).*
High performance bulk Ti—Cu—Ni—Sn—Ta nanocomposites based on a dendrite eutectic microstructure Q.L. Dai, B.B. Sun and M.L. Sui J. Material research Society vol. 19 No. 9 Sep. 2004 (Year: 2004).*
International Search Report and Written Opinion for International Application No. PCT/US2018/035813, Search completed Dec. 12, 2018, dated Dec. 12, 2018, 11 Pgs.
Narayan et al., "On the hardness and elastic modulus of bulk metallic glass matrix composites", Scripta Materialia, Jun. 9, 2010, vol. 63, Issue 7, pp. 768-771.
Ni et al., "High performance amorphous steel coating prepared by HVOF thermal spraying", Journal of Alloys and Compounds, Jan. 7, 2009, vol. 467, pp. 163-167, Nov. 29, 2007.
Nishiyama et al., "Recent progress of bulk metallic glasses for strain-sensing devices", Materials Science and Engineering: A, vols. 449-451, Mar. 25, 2007, 79-83.
Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.
Parlar et al., "Sliding tribological characteristics of Zr-based bulk metallic glass", Intermetallics, Jan. 2008, vol. 16, pp. 34-41.
Pauly et al., "Modeling deformation behavior of Cu—Zr—Al bulk metallic glass matrix composites", Applied Physics Letters, Sep. 2009, vol. 95, pp. 101906-1-101906-3.
Pauly et al., "Processing Metallic Glasses by Selective Laser Melting", Materials Today, Jan./Feb. 2013, vol. 16, pp. 37-41.
Pauly et al., "Transformation-mediated ductility in CuZr-based bulk metallic glasses", Nature Materials, May 16, 2010, vol. 9, Issue 6, pp. 473-477.
Ponnambalam et al., "Fe-based bulk metallic glasses with diameter thickness larger than one centimeter", J Mater Res, Feb. 17, 2004. vol. 19, pp. 1320-1323.
Porter et al., "Incorporation of Amorphous Metals into MEMS for High Performance and Reliability", Rockwell Scientific Company, Final Report, Nov. 1, 2003, 41 pgs.
Prakash et al., "Sliding wear behavior of some Fe-, Co-and Ni-based metallic glasses during rubbing against bearing steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.
Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Sanders et al., "Stability of Al-rich glasses in the Al—La—Ni system", 2006, Intermetallics, 14, pp. 348-351.

(56) References Cited

OTHER PUBLICATIONS

Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138.
Shen et al., "3D printing of large, complex metallic glass structures", Materials and Design, Mar. 2017, vol. 117, pp. 213-222.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sun et al., "Fiber metallic glass laminates", Dec. 2010, J. Mater. Res., vol. 25, No. 12, pp. 2287-2291.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of $Cu_{60}Zr_{30}Ti_{10}$ bulk metallic glass", Materials Science and Engineering, Apr. 1, 2004, vol. A384 pp. 138-142.
Tan et al., "Synthesis of La-based in-situ bulk metallic glass matrix composite", Intermetallics, Nov. 2002, vol. 10, Issues 11-12, pp. 1203-1205.
Tao et al., "Effect of rotational sliding velocity on surface friction and wear behavior in Zr-based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr-based bulk-metallic glasses and their composites", Intermetallics, Mar. 6, 2009, vol. 17, pp. 579-590.
Whang et al., "Microstructures and age hardening of rapidly quenched Ti—Zr—Si alloys", Journal of Materials Science Letters,1985, vol. 4, pp. 883-887.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal vol. fraction for mechanical property predictions of fibre-reinforced aluminum laminates", Journal of Materials Science, vol. 29, issue 17, 4583, Jan. 1994, 9 pages.
Yin, Enhuai et al. "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, pp. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
Extended European Search Report for European Application No. 14889035.3, Search completed Dec. 4, 2017, dated Dec. 13, 2017, 10 Pgs.
International Preliminary Report on Patentability for International Application PCT/US2013/047950, issued Dec. 31, 2014, dated Jan. 8, 2015, 7 Pgs.
International Preliminary Report on Patentability for International Application PCT/US2013/050614, issued Jan. 20, 2015, dated Jan. 29, 2015, 9 Pgs.
International Preliminary Report on Patentability for International Application PCT/US2014/033510, issued Oct. 12, 2016, dated Oct. 20, 2016, 9 Pgs.
International Preliminary Report on Patentability for International Application PCT/US2014/056615, issued Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/034481, Search completed Sep. 10, 2018, dated Sep. 10, 2018, 19 Pgs.
International Search Report and Written Opinion for International Application No. PCT/US2018/034924, Search completed Sep. 18, 2018, dated Sep. 19, 2018, 15 Pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wkipedia. https://en.wikipedia.org/wiki/Group_4_element. Published Jun. 11, 2010. Accessed Aug. 24, 2016.
"Harmonic Drive AG", website, printed from http://harmoncdrive.aero/?idcat=471, Feb. 20, 2014, 2 pgs.

(56) References Cited

OTHER PUBLICATIONS

"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AlSI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., vol. 24, No. 12, pp. 3611-3619, Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs, Oct. 1, 2001.
Byrne et al., "Bulk Metallic Glasses", Science, Jul. 25, 2008, vol. 321, pp. 502-503.
Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.
Cheng, J. B. "Characterization of mechanical properties of FeCrBSiMnNbY metallic glass coatings", J Mater Sci., Apr. 16, 2009, vol. 44, pp. 3356-3363.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430.
Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.
Conner et al., "Shear band spacing under bending of Zr-based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, Jan. 20, 2006, vol. 54, pp. 1403-1408.
Dai et al., "High-performance bulk Ti—Cu—Ni—Sn—Ta nanocomposites based on a dendrite-eutectic microstructure", Journal of Materials Research, Sep. 2004 , vol. 19, No. 9, pp. 2557-2566.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95, pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, 528, pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-A377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.
Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, pp. 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Gu et al., "Selective Laser Melting Additive Manufacturing of Ti-Based Nanocomposites: The Role of Nanopowder", Metallurgical and Materials Transactions A, Jan. 2014, vol. 45, Issue 1, pp. 464-476.
Guo et al., "Tensile ductility and necking of metallic glass", Nature Materials, Oct. 2007, vol. 6, pp. 735-739.
Ha et al., "Tensile deformation behavior of two Ti-based amorphous matrix composites containing ductile β dendrites", Materials Science and Engineering: A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, pp. 135502-1-135502-4.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.
Hays, C. C. "Microstructure Controlled Shear Band Pattern Formation and Enhanced Plasticity of Bulk Metallic Glasses Contain-

(56) References Cited

OTHER PUBLICATIONS ing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.
Hofmann, "Shape Memory Bulk Metallic Glass Composites", Science, Sep. 10, 2010, vol. 329, pp. 1294-1295.
Hofmann, "Development of tough, low-density titanium-based bulk metallic glass matrix composites with tensile ductility", PNAS, Dec. 23, 2008, vol. 105, pp. 20136-20140.
Hofmann et al., "Designing metallic glass matrix composites with high toughness and tensile ductility", Nature Letters, Feb. 28, 2008, vol. 451, pp. 1085-1090.
Hofmann et al., "Improving Ductility in Nanostructured Materials and Metallic Glasses: Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
Hu et al., "Crystallization Kinetics of the $Cu_{47.5}Zr_{74.5}Al_5$ Bulk Metallic Glass under Continuous and Iso-thermal heating", App. Mech. and Materials, vols. 99-100, Sep. 8, 2011, p. 1052-1058.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.
Huang et al., "Fretting wear behavior of bulk amorphous steel", Intermetallics, Jun. 12, 2011, vol. 19, pp. 1385-1389.
Inoue et al., "Cobalt-based bulk glassy alloy with ultrahigh strength and soft magnetic properties", Nature Materials, Sep. 21, 2003, vol. 2, pp. 661-663.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267.
Ishida et al., "Wear resistivity of super-precision microgear made of Ni-based metallic glass", Materials Science and Engineering, Mar. 25, 2007, vol. A449-451, pp. 149-154.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931.
Johnson et al., "Quantifying the Origin of Metallic Glass Formation", Nature Communications, Jan. 20, 2016, vol. 7, 10313, 7 pgs, doi: 10.1038/ncomms10313.
Jung et al., "Fabrication of Fe-based bulk metallic glass by selective laser melting: A parameter study", Materials and Design, Jul. 30, 2015, vol. 86, pp. 703-708.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim, Junghwan et al. "Oxidation and crystallization mechanisms in plasma-sprayed Cu-based bulk metallic glass coatings", Acta Materialia., Feb. 1, 2010, vol. 58, pp. 952-962.
Kim et al., "Amorphous phase formation of Zr-based alloy coating by HVOF spraying process", Journal of Materials Science, Jan. 1, 2001, vol. 36, pp. 49-54.
Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307.
Kim et al., "Weldability of $Cu_{54}Zr_{22}Ti_{18}Ni_6$ bulk metallic glass by ultrasonic welding processing", Materials Letters, May 17, 2014, 130, pp. 160-163.
Kobayashi et al., "Fe-based metallic glass coatings produced by smart plasma spraying process", Materials Science and Engineering, Feb. 25, 2008, vol. B148, pp. 110-113.
Kobayashi et al., "Mechanical property of Fe-base metallic glass coating formed by gas tunnel type plasma spraying", ScienceDirect, Surface & Coatings Technology, Mar. 14, 2008, 6 pgs.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158.
Kozachkov et al., "Effect of cooling rate on the volume fraction of B2 phases in a CuZrAlCo metallic glass matrix composite", Intermetallics, Apr. 19, 2013, vol. 39, pp. 89-93.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476.
Kwon et al., "Wear behavior of Fe-based bulk metallic glass composites", Journal of Alloys and Compounds, Jul. 14, 2011, vol. 509S, pp. S105-S108.
Launey et al., "Fracture toughness and crack-resistance curve behavior in metallic glass-matrix composites", Applied Physics Letters, Jun. 18, 2009, vol. 94, pp. 241910-1-241910-3.
Launey et al., "Solution to the problem of the poor cyclic fatigue resistance of bulk metallic glasses", PNAS Early Edition, pp. 1-6, Jan. 22, 2009.
Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.
Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948.
Li et al., "Selective laser melting of Zr-based bulk metallic glasses: Processing, microstructure and mechanical properties", Materials and Design, Sep. 21, 2016, vol. 112, pp. 217-226.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract

(56) References Cited

OTHER PUBLICATIONS

DE-AC07-05ID14517, 22nd Annual Conference on Fossil Energy Materials, Pittsburgh, U.S., Jul. 1, 2008, 8 pgs.
Lin et al., "Designing a toxic-element-free Ti-based amorphous alloy with remarkable supercooled liquid region for biomedical application", Intermetallics, Jul. 9, 2014, vol. 55, pp. 22-27.
List, A. et al. "Impact Conditions for Cold Spraying of Hard Metallic Glasses", Journal of Thermal Spray Technology, Jun. 1, 2012, vol. 21, No. 3-4, pp. 531-540.
Liu, X. Q. "Microstructure and properties of Fe-based amorphous metallic coating produced by high velocity axial plasma spraying", Science Direct, Journal of Alloys and Compounds, Apr. 23, 2009, vol. 484, pp. 300-307.
Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.
Liu et al., "Metallic glass coating on metals plate by adjusted explosive welding technique", Applied Surface Science, Jul. 16, 2009, vol. 255, pp. 9343-9347.
Liu et al., "Sliding Tribological Characteristics of a Zr-based Bulk Metallic Glass Near the Glass Transition Temperature", Tribol. Lett., Jan. 29, 2009, vol. 33, pp. 205-210.
Liu et al., "Wear behavior of a Zr-based bulk metallic glass and its composites", Journal of Alloys and Compounds, May 5, 2010, vol. 503, pp. 138-144.
Lupoi, R. et al. "Deposition of metallic coatings on polymer surfaces using cold spray", Science Direct, Surface & Coatings Technology, Sep. 6, 2010, vol. 205, pp. 2167-2173.
Ma et al., "Wear resistance of Zr-based bulk metallic glass applied in bearing rollers", Materials Science and Engineering, May 4, 2004, vol. A386, pp. 326-330.
Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.
Madge, "Toughness of Bulk Metallic Glasses, Metals", vol. 5, Issue 3, pp. 1127-1769, ISSN 2075-4701, Jul. 17, 2015 See p. 1287.
Mahbooba et al., "Additive manufacturing of an iron-based bulk metallic glass larger than the critical casting thickness", Applied Materials Today, Feb. 27, 2018, vol. 11, pp. 264-269.
International Preliminary Report on Patentability for International Application PCT/US2018/035813, Report issued Dec. 3, 2019, dated Dec. 12, 2019, 9 Pgs.
International Preliminary Report on Patentability for International Application PCT/US2018/034481, Report issued Nov. 26, 2019, dated Dec. 5, 2019, 17 Pgs.
International Preliminary Report on Patentability for International Application PCT/US2018/034924, Report issued Nov. 26, 2019, dated Dec. 5, 2019, 13 Pgs.
Kumar et al., "Embrittlement of Zr-based Bulk Metallic Glasses", Science Direct, Acta Materialia, Year 2009, vol. 57, pp. 3572-3583.
Lu et al., "Crystallization Prediction on Laser Three-Dimensional Printing of Zr-based Bulk Metallic Glass", Journal of Non-Crystalline Solids, Year 2017, vol. 461, pp. 12-17.
Yao et al., "Fe-Based Bulk Metallic Glass With High Plasticity", Applied Physics Letters, Feb. 5, 2007, vol. 90, 061901, doi: 10.1063/1.2437722.
Yokoyama et al., "Tough Hypoeutectic Zr-Based Bulk Metallic Glasses", Metallurgical and Materials Transactions, Year 2011, vol. 42A, pp. 1468-1475.
Zhuo et al., "Ductile Bulk Aluminum-Based Alloy with Good Glass-Forming Ability and High Strength", Chinese Physics Letters, vol. 26, No. 6, Year: 2009.
Extended European Search Report for European Application No. 18806700.3, Search completed Oct. 20, 2020, dated Oct. 28, 2020, 7 pgs.
Extended European Search Report for European Application No. 18809486.6, Search completed Sep. 30, 2030, dated Oct. 12, 2020, 7 pgs.
Qiao et al., "Metallic Glass Matrix Composites", Materials Science and Engineering, Feb. 2016, vol. 100, pp. 1-69, http://dx.doi.org. 10.10163/jmser.2015.12.001.
Roberts, , "Developing and Characterizing Bulk Metallic Glasses for Extreme Applications", XP055731434, Retrieved from the Internet (Dec. 16, 2013): URL:https://thesis.library.caltech.edu/8049/141/Scott_Roberts_thesis_2013_Complete_ Thesis. pdf [retrieved on Sep. 17, 2020].
Extended Search Report for European Application No. 18805898.6, Search completed Jan. 20, 2021 , dated Jan. 28, 2021, 13 Pgs.
Zhang et al., "Grain morphology control and texture characterization of laser solid formed Ti6Al2Sn2Zr3Mo1.5Cr2Nb titanium alloy", Journal of Materials Processing Technology, Elsevier, NL, vol. 238, Jul. 8, 2016 (Jul. 8, 2016), pp. 202-211, XP029700970, ISSN: 0924-0136, DOI: 10.1016/J.JMATPROTEC.2016.07.011.

* cited by examiner

Prior Art

FIG. 2A
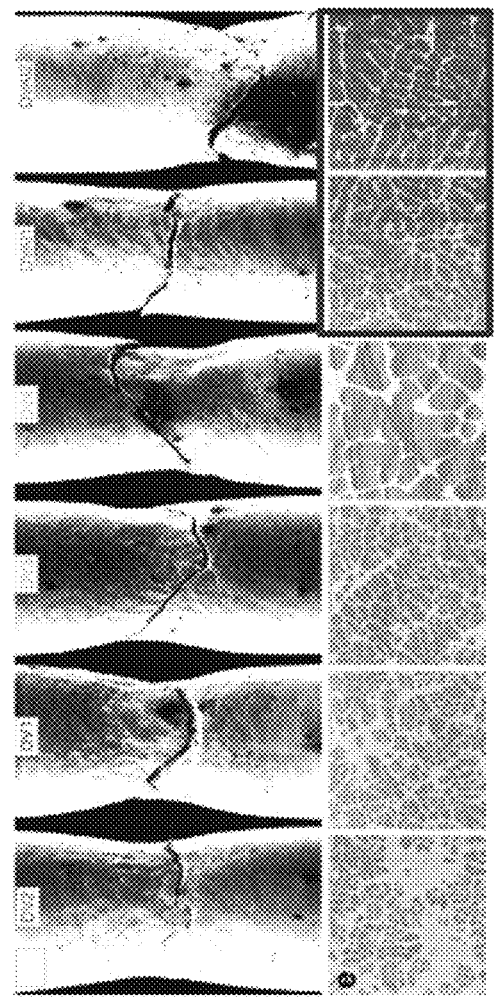
Prior Art
FIG. 2B
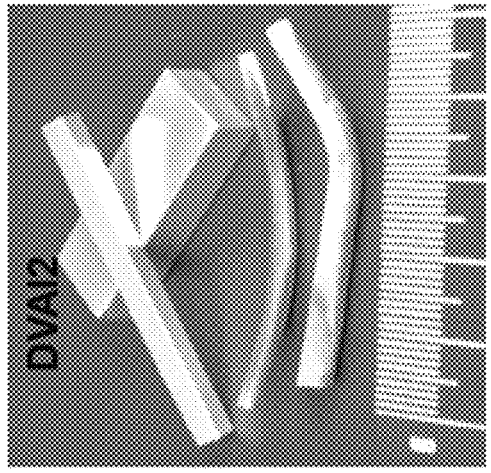
Prior Art
FIG. 2C
| name | atomic % | BMG (%) | bcc dendrite (%) | $\rho$ (g/cm³) | $\sigma_y$ (MPa) | $\sigma_{max}$ (MPa) | $\epsilon_y$ (%) | $\epsilon_{tot}$ (%) | $\sigma_{max}/\rho$ (MPa cm³/g) | RoA (%) | $K_{1C}$ (MPa m^{1/2}) | E (GPa) | G (GPa) | $\nu$ | $T_s$ (K) |
|---|---|---|---|---|---|---|---|---|---|---|---|---|---|---|---|
| DV2 | $Ti_{44}Zr_{20}V_{12}Cu_{5}Be_{19}$ | 70 | 30 | 5.13 | 1597 | 1614 | 2.1 | 9.5 | 315 | 34 | na | 94.5 | 34.8 | 0.358 | 956 |
| DV1 | $Ti_{48}Zr_{20}V_{12}Cu_{5}Be_{15}$ | 53 | 47 | 5.15 | 1362 | 1429 | 2.3 | 12.5 | 277 | 43 | 43.8 | 94.2 | 34.4 | 0.368 | 955 |
| DV3 | $Ti_{56}Zr_{18}V_{10}Cu_{4}Be_{12}$ | 46 | 54 | 5.08 | 1308 | 1309 | 2.2 | 8.6 | 258 | 31 | 47.4 | 84.0 | 30.5 | 0.379 | 951 |
| DV4 | $Ti_{60}Zr_{16}V_{8}Cu_{5}Be_{9}$ | 40 | 60 | 5.03 | 1086 | 1089 | 2.1 | 9.8 | 217 | 42 | 61.6 | 83.7 | 30.4 | 0.377 | 940 |
| DVA11 | $Ti_{60}Zr_{16}V_{9}Cu_{4}Al_{2}Be_{9}$ | 31 | 69 | 4.97 | 1166 | 1189 | 2.0 | 9.3 | 239 | 27 | na | 84.2 | 31.0 | 0.360 | 901 |
| DVA12 | $Ti_{67}Zr_{11}V_{10}Cu_{3}Al_{4}Be_{5}$ | 20 | 80 | 4.97 | 990 | 1000 | 2.0 | 8.4 | 201 | 28 | na | 73.7 | 28.6 | 0.376 | 998 |
| Ti-6-4a | $Ti_{90.1}Al_{6.3}V_{3.6}$ | na | na | 4.43 | 754 | 882 | 1.0 | 16.4 | 199 | 42 | 100.0 | 113.8 | 44.0 | 0.342 | 1877 |
| Ti-6-4s | $Ti_{90.1}Al_{6.3}V_{3.6}$ [Ref] | na | na | 4.43 | 1100 | 1170 | ~1 | ~10 | 264 | na | 43.0 | 114.0 | 44.0 | 0.330 | 1877 |
| CP-Ti | $Ti_{100}$ | na | na | 4.51 | 380 | 409 | 0.7 | 25.5 | 91 | 46 | 66.0 | 105.0 | 45.0 | 0.370 | ~1930 |
Prior Art Prior Art Prior Art Prior Art FIG. 5A
FIG. 5B
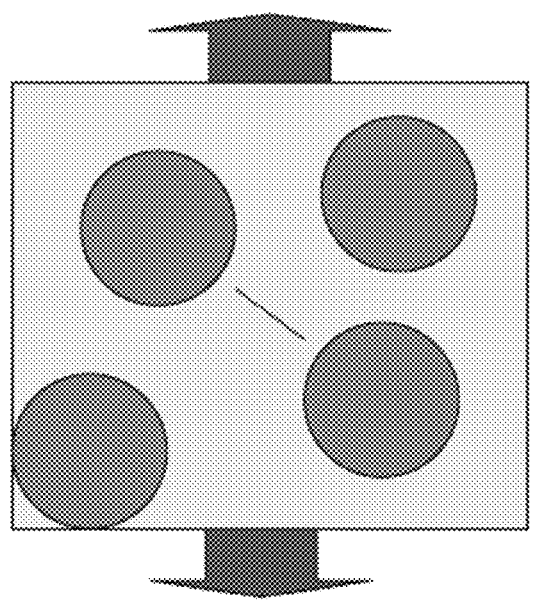
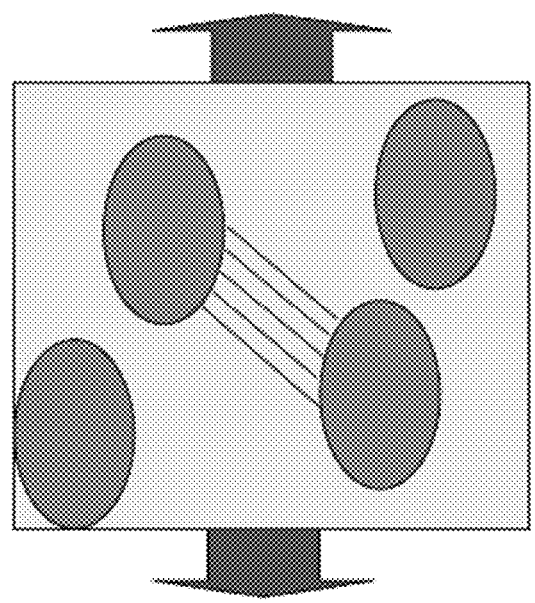

$$R_p = K_{1C}^2 / \pi \sigma_y^2$$

$R_p$ = plastic zone size, $K_{1C}$ = fracture toughness, $\sigma_y$ = yield stress

| Brittle Materials | $K_{1C}$ (MPa m$^{1/2}$) | $R_P$ (μm) |
|---|---|---|
| BMG's | 3-50 | 1-100 |
| Oxide Glasses | < 5 | < 1 |
| Ceramics | < 5 | < 1 |
| Bulk Nanomaterials | < 10 | < 10 |
| Intermetallics | < 10 | < 10 |

Shear band that reached its critical length

Plastic zone at the tip of a crack in a fracture toughness experiment

Prior Art

40% dendrites, crack grows easy

60% dendrites, crack is impeded

80% dendrites, crack can be stopped

FIG. 8

DENDRITE-REINFORCED TITANIUM-BASED METAL MATRIX COMPOSITES

CROSS-REFERENCE TO RELATED APPLICATIONS

The present application claims priority to U.S. Provisional Application No. 62/511,668, entitled "Dendrite-Reinforced Titanium-Based Metal Matrix Composites for Additive Manufacturing", filed May 26, 2017, the disclosure of which is incorporated herein by reference in its entirety.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The current disclosure is directed to Ti-based metal matrix composites, methods of their additive manufacture, and parts manufactured therefrom and thereby.

BACKGROUND OF THE INVENTION

Bulk metallic glasses (BMGs), also known as amorphous or glassy metals, are alloys which can be quenched into a vitreous state at a relatively large casting thickness (generally over 1 mm). In turn, BMG matrix composites (BMGMCs) are two-phase materials, comprising a high strength BMG matrix and a dispersed crystalline phase grown in-situ during the alloy's cooling from melt due to chemical segregation. In contrast, ultra-fine grained metal matrix composites (UFGMCs) are rapidly cooled alloys that exhibit a nanocrystalline microstructure. UFGMCs can be thought of as insufficiently fast cooled metallic glasses that have been cooled fast enough to have a small grain size.

Metal additive manufacturing, also commonly known as metal 3D printing, is an emerging manufacturing technology, which is being rapidly integrated into commercial applications, such as fabrication of nozzles in aircraft and rocket engines. Typically, a 3D printing process comprises sequential deposition of a multitude of thin layers of a material to assemble a desired bulk part or structure. The most common forms of metal additive manufacturing are direct metal laser sintering, directed energy deposition, thermal spray additive manufacturing, laser foil welding, and ultrasonic additive manufacturing. Recently, it has been shown that bulk metallic glass parts can also be fabricated by additive manufacturing.

SUMMARY OF THE INVENTION

The current disclosure is directed to embodiments of Ti-based metal matrix composites, methods of their additive manufacture, and parts manufactured therefrom and thereby.

Many embodiments of the disclosure are directed to methods of fabricating a part thicker than 0.5 mm via layer-by-layer additive manufacturing including:

providing an alloy having at least 85 atomic % of at least Ti and at least one component selected from the group of Zr, Hf, Ta, Nb, V, and Mo, and one or more additional components, X, selected from the group of Co, Fe, Ni, Cu, Al, B, Ag, Pd, Au, Pd, C, Si, and Sn, wherein the atomic % of Ti is greater than any other single component;

disposing molten layers of the alloy atop one another additively;

cooling each layer prior to disposition of the next at a rate such that upon solidification the alloy segregates phases into a metal matrix composite consisting of isolated crystalline dendrites in a continuous eutectic matrix material; and repeating the disposing and cooling to form a metal matrix composite part.

In other embodiments, the alloy comprises a combination of Zr, a beta-stabilizer, and X, where the atomic percentage of the Ti, Zr, and beta-stabilizer is between 85 to 98 atomic % of the alloy, and where X comprises from 2 to 15 atomic % of the alloy.

In still other embodiments, the beta-stabilizer is selected from the group of V, Nb, Ta and Mo.

In yet other embodiments, Ti comprises at least 50 atomic % of the alloy.

In still yet other embodiments, the alloy comprises one or both Zr and Hf, a beta-stabilizer, B, and X, where the combination of Ti, Zr and Hf, and the beta-stabilizer is between 85 to 98 atomic % of the alloy, where B comprises from between 0.5 to 5 atomic % of the alloy, and where X comprises less than 10 atomic % of the alloy.

In still yet other embodiments, the beta-stabilizing components are selected from the group of V, Nb, Ta and Mo, and wherein X is selected from the group of Zr, B, Si, Cu, Co, Fe, and Pd.

In still yet other embodiments, the thickness of each of the layer is from between 10-1000 micrometers.

In still yet other embodiments, the cooling rate is greater than $10^2$ K/s.

In still yet other embodiments, the crystalline dendrites comprise at least 60% by volume of the solidified alloy.

In still yet other embodiments, the hardness of the matrix is at least 5% larger than the hardness of the dendrites.

In still yet other embodiments, the composite part has at least one property selected from the group of a tensile strength of greater than 1 GPa, a fracture toughness of greater than 40 MPa m$^{1/2}$, a density of less than 6.0 g/cm$^3$, total strain to failure of greater than 5% in a tension test, and a yield strength divided by the density greater than 200 MPa cm$^3$/g.

In still yet other embodiments, the alloy is formed by adding components to Ti.

In still yet other embodiments, the solidus temperature of the alloy is less than 1600 Celsius.

In still yet other embodiments, the crystalline dendrites range in size from 1 to 20 micrometers in diameter after solidification.

In still yet other embodiments, the crystalline dendrites are less than 10 micrometers in diameter after solidification.

In still yet other embodiments, the alloy is heated to a semi-solid temperature region between the alloy solidus and liquidus during disposition.

In still yet other embodiments, the part is used in a structural application.

In still yet other embodiments, the heating and cooling disposition parameters are altered between the disposition of at least two layers of the part such that the one of either the size or the density of the dendrites is altered within at least two layers of the part such that a gradient of properties is formed within the part.

In still yet other embodiments, the disposition process is selected from one of powder bed fusion, direct energy deposition, laser foil welding, fused filament fabrication, electron beam fabrication, thermal spraying, and liquid deposition.

In still yet other embodiments, the disposition process is selected from one of binder jetting, friction stir additive manufacturing, cold spraying, and ultrasonic additive manufacturing.

In still yet other embodiments, the alloy comprises Nb and from 2 to 15 atomic % B.

In still yet other embodiments, the concentration of B is 5 atomic %.

In still yet other embodiments, the alloy is selected from the group of $Ti_{74}V_{10}Zr_{10}Si_6$, $Ti_{64}V_{10}Zr_{20}Si_6$, $Ti_{71}V_{10}Zr_{10}Si_6Al_3$, $Ti_{74}Nb_{10}Zr_{10}Si_6$, $Ti_{74}Ta_{10}Zr_{10}Si_6$, $Ti_{75}Cu_7Ni_6Sn_2V_{10}$, $Ti_{75}Cu_7Ni_6Sn_2Nb_{10}$, $Ti_{75}Cu_7Ni_6Sn_2Ta_{10}$, $(Ti_{72}Zr_{22}Nb_6)_{95}Co_5$, $(Ti_{72}Zr_{22}Nb_6)_{92}Co_5Al_3$, $(Ti_{72}Zr_{22}Ta_6)_{95}Co_5$, $(Ti_{72}Zr_{22}Ta_6)_{92}Co_5Al_3$, $(Ti_{72}Zr_{22}V_6)_{95}Co_5$, $(Ti_{72}Zr_{22}V_6)_{92}Co_5Al_3$, $Ti_{90}Nb_5Cu_5$, $Ti_{85}Nb_{10}Cu_5$, $Ti_{80}Nb_5Cu_{10}$, $Ti_{80}Nb_{10}Cu_{10}$, $Ti_{90}Ta_5Cu_5$, $Ti_{85}Ta_{10}Cu_5$, $Ti_{80}Ta_5Cu_{10}$, $Ti_{80}Ta_{10}Cu_{10}$, $Ti_{90}V_5Cu_5$, $Ti_{85}V_{10}Cu_5$, $Ti_{80}V_5Cu_{10}$, $Ti_{80}V_{10}Cu_{10}$, $Ti_{85}V_{10}B_5$, $Ti_{85}Ta_{10}B_5$ and $Ti_{85}Nb_{10}B_5$, $Ti_{57}Zr_{18}V_{12}Cu_{10}Al_3$ or $Ti_{62}Zr_{18}V_{12}Cu_5Al_3$.

In still yet other embodiments, the metal matrix component part is selected form the group of biomedical implants, structural aerospace components, sporting equipment, medical devices, and engine components.

In still yet other embodiments, the matrix material and the crystalline dendrites are combined ex situ to form the metal matrix composite.

In still yet other embodiments, the matrix material and crystalline dendrites are in the form of powders with a size distribution within 10% of each other.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 1A and 1B provide micrograph images of Ti-MMCs, wherein FIG. 1A shows a Ti-BMGMC, and FIG. 1B shows a Ti-MMC with a crystalline eutectic.

FIGS. 2A to 2E provide data showing properties of Ti-BMGMCs in accordance with the prior art.

FIGS. 5A and 5B provide schematics of Ti-MCCs in accordance with embodiments.

FIG. 8 provides a periodic table showing compositional parameters for Ti-based MCCs in accordance with embodiments.

DETAILED DISCLOSURE

Figure 1A:
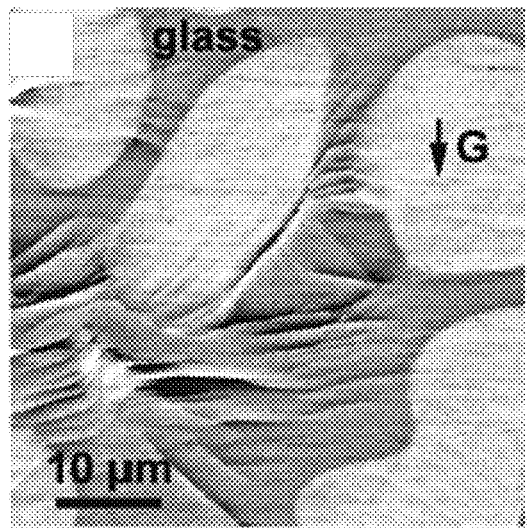

The embodiments of the invention described herein are not intended to be exhaustive or to limit the invention to precise forms disclosed. Rather, the embodiments selected for description have been chosen to enable one skilled in the art to practice the invention.

Turning to the figures and data, embodiments of alloys for forming Ti-based metal matrix composites, methods of their additive manufacture, and parts manufactured therefrom and thereby are provided. Various embodiments are directed to layer-by-layer additive manufacturing methods for fabricating Ti-based metal matrix composite parts thicker than 0.5 mm, in layers with thickness between 10-1000 micrometers. In various such embodiments the cooling rate in each deposited layer is greater than $10^3$ K/s. In some such embodiments the part may have one or more of the following properties: a tensile strength greater than 0.8 GPa, a fracture toughness greater than 40 MPa $m^{1/2}$, a yield strength divided by the density greater than 200 MPa $cm^3$/g, and a total strain to failure in a tension test greater than 5% in either the asprinted conditions or a heat treated condition after printing.

In many such embodiments, upon solidification, the alloy segregates phases into a metal matrix composite consisting of isolated crystalline dendrites in a continuous matrix material. In some embodiments, the continuous matrix comprises a nanocrystalline metal alloy. In various such embodiments the most abundant element in the alloy is titanium, and comprises greater than 50% of the alloy by atomic percentage. In various other embodiments the atomic percentage of one or more of titanium, zirconium, hafnium, tantalum, niobium, vanadium and/or molybdenum present in the alloy sums to greater than 85 atomic percentage. In many embodiments the elements may be strategically added to titanium to produce a continuous matrix with dendrites upon solidification. In some such embodiments, the alloy exhibits at least 60% by volume crystalline dendrites in a continuous matrix. In some other such embodiments the hardness of the matrix is at least 5% larger than hardness of the dendrites. In various such embodiments the density of the alloy may be between 4 and 6 $g/cm^3$.

Properties of Ti-Based Metal Alloys

Ti-based metal alloys possess many advantageous properties and are widely used in high-performance applications, often outperforming very high strength materials, such as steel. Specifically, Ti alloys typically exhibit high tensile strengths, combined with low density, excellent corrosion resistance, superior hardness, high flexibility (especially relative to steel), and, in addition, Ti alloys have paramagnetic properties, which can be advantageous for many uses. Furthermore, titanium metal is a dimorphic allotrope with two possible crystal structure lattices: hexagonal closed packed (HCP, also known as the alpha (α) form) and body centered cubic (BCC, also known as the beta (β) form). As such, the additions of different elements to pure Ti can be used to control the crystal structure of the resulting alloy, with dramatic effects on the resulting mechanical properties. For example, β-Ti alloys typically comprise Ti alloyed with so-called β-stabilizing elements, such as Nb, Ta, V, Mo, Zr, or Sn, wherein the presence of these additional elements, even in small amounts, promotes BCC lattice formation. As compared to pure, non-alloyed Ti, or α-Ti alloys, β-Ti alloys exhibit higher density (due to the higher packing density of the BCC lattices), lower strength, softer, larger ductility, higher fracture toughness, and a greater fatigue endurance limit, as well as a lower specific strength. In contrast, α-Ti alloys, which contain α-stabilizing and HCP-phase promoting elements, such as Al, Cu, Co, Ni, or Si, demonstrate high strength, but lower toughness and ductility.

The most common alloy of Ti is Ti-6Al-4V, which is an α/β-Ti-alloy comprising both α and β stabilizing elements. This alloy is known for possessing a combination of excellent properties, as well as for its tolerance towards heat treatment. Specifically, in its annealed state, Ti-6Al-4V has a low density of 4.43 g/cm$^3$, yield strength of 800 MPa, 10% total strain to failure in tension, and a specific strength of 264. However, despite exhibiting an optimal combination of properties, the Ti-6Al-4V alloy also possesses some detrimental characteristics that limit its use. For example, the alloy has poor wear resistance, a very low fracture toughness of 43 MPa m$^{1/2}$ (especially as compared to steel, which has a fracture toughness of >100 MPa m$^{1/2}$), and a strength that is only ~50% of that found for the best available steel. Moreover, the alloy becomes brittle when formed into parts with thicker cross-sections, is difficult to conventionally machine, and cannot be easily die cast or injection molded (due to the alloy's high melting temperature of >1600° C., which exceeds the melting temperature of most molds). In addition, while widely used in biomedical applications, Ti-6Al-4V is not completely non-toxic due to the presence of aluminum, which dissolves in the blood. Therefore, the development of Ti-based alloys that improve on all of the shortcomings of the ubiquitous Ti-6Al-4V is highly desired.

Creating new alloys that improve on the properties of Ti-6Al-4V is challenging due to the inherent limits of dislocation-based plasticity. In other words, any crystalline alloy in the Ti-6Al-4V family will likely have similar problematic physical properties. Typically, the strength and hardness of a crystalline alloy is inversely proportional to its ductility and fracture toughness. For example, increasing the strength of a crystalline Ti-alloy, which can be done easily, makes the alloy more prone to brittle fracture. Therefore, although various strategies for tuning the properties of Ti alloys have been reported (e.g. balancing of c and 3 stabilizing elements), none of these strategies have produced a Ti-alloy capable of exceeding the combined characteristics of the Ti-6Al-4V alloy (e.g., with a yield strength of greater than 1.5 GPa, a total strain to failure in tension of at least 5%, a fracture toughness larger than 43 MPa m$^{1/2}$, and, simultaneously, a specific strength greater than 250. In fact, since the specific strength is inversely proportional to the density (i.e. the specific strength is equal to the yield strength divided by the density), it is especially difficult to obtain this desired combination of properties, due to the low density of Ti-6Al-4V (4.43 g/cm$^3$).

One alternative approach to improving the properties of Ti-based alloys is to form them as dendrite-reinforced metal matrix composite (MMC) materials. Such MMCs are also known as in-situ MMCs, because the alloy reinforcing dendrites are formed directly during the alloy solidification from the melt, rather than added separately, due to chemical desegregation. In the MMC approach, an alloy is formulated with a composition that makes it phase-separate upon solidification into a multi-phase composite, which is comprised of relatively soft, low shear modulus (G) Ti-based dendrites dispersed in a continuous matrix of a high-modulus and high-strength material. Consequently, the presence of a sufficient amount of soft Ti-based dendrites suppresses crack growth and brittle failure for the alloy under tension, enhancing its strength and toughness. Although the Ti-based dendrites that form will normally be inherently softer than the matrix, they can be softened further with the addition of a beta stabilizing element(s) into the alloy.

Figure 1B:
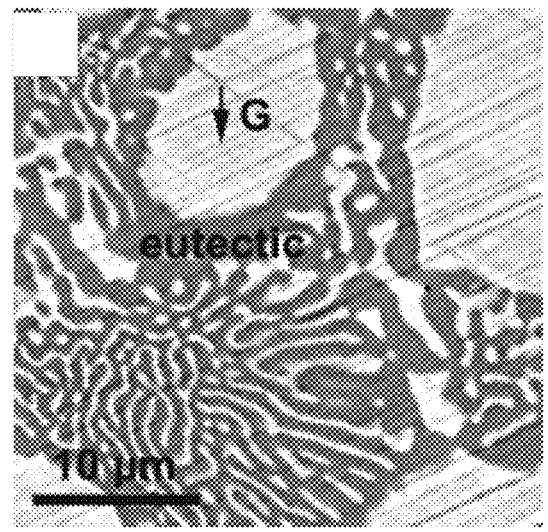

Two classes of MMCs have traditionally been considered for Ti-based alloys: (1) bulk metallic glass matrix-based MMCs (BMGMCs) and (2) ultra-fine grained metal matrix-based MMCs (UFGMCs). BMGMCs are formulated such that their matrix material forms a metallic glass (also known as an amorphous metal) upon cooling (as shown in FIG. 1A), while the UFGMCs are formulated such that they form a fine-grained or nanograined crystalline metal matrix (as shown in FIG. 1B). With heat treating or decreased cooling rate, the UFGMCs can also exhibit a crystalline eutectic with a larger grain size, if desired. Both classes comprise a Ti alloy reinforced with a beta-stabilizing element (to soften the Ti dendrites) and additional elements, which phase segregate upon solidification due to their low solubility in the (beta Ti) alloy. Consequently, the mechanical properties of the MMCs combine high strength (due to the strength of the continuous matrix) with high ductility and toughness (due to the presence of crack-stabilizing soft dendrites). Notably, the MMCs' advantageous combination of properties can, at times, exceed the rule of mixtures, which, typically, dictates a balance between strength and ductility.

Figure 2D:
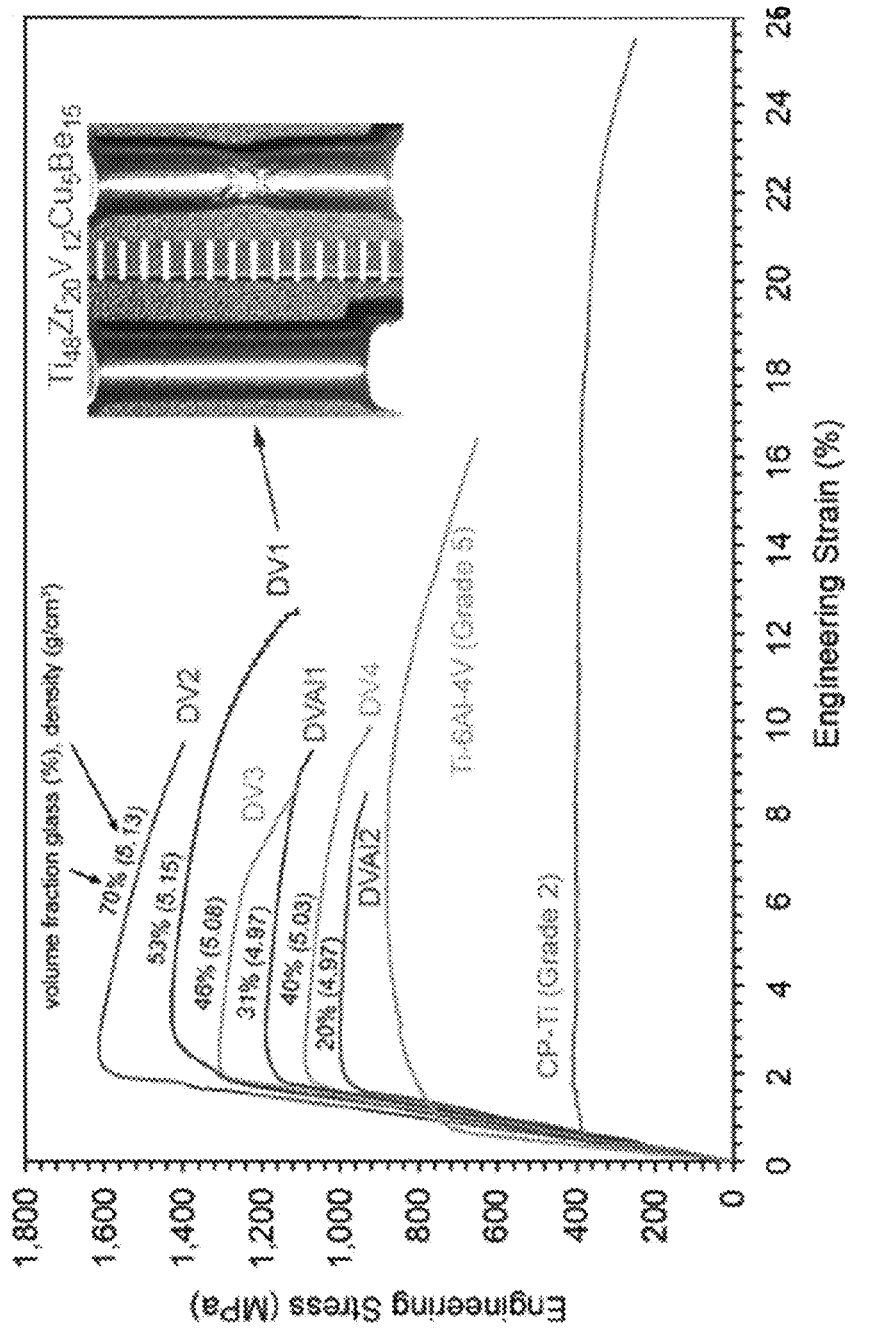
Figure 2E:
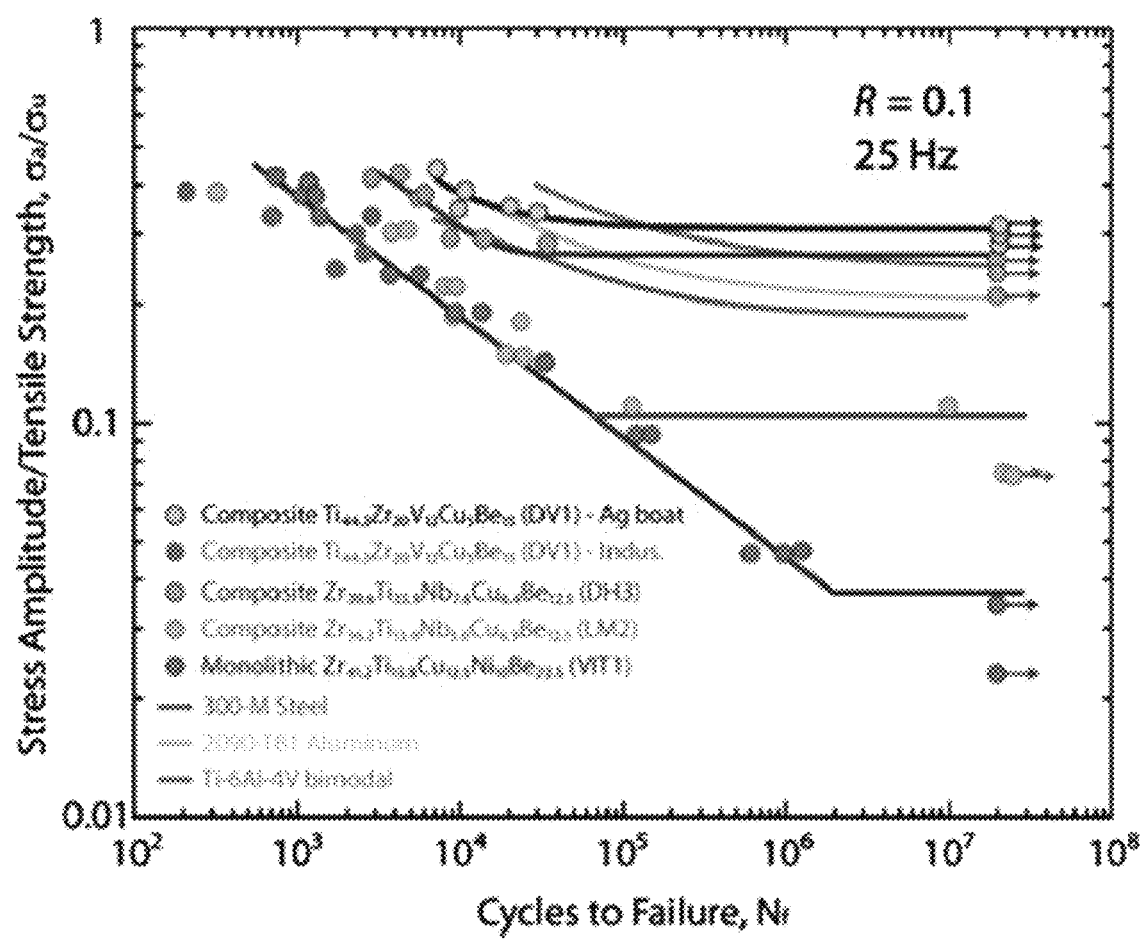

These strategies of using MMCs to improve the properties of Ti-6Al-4V have been previously demonstrated, including, most notably, by Hofmann et al. and illustrated in FIGS. 2A through 2D. (See, e.g., Hofmann, et al., *PNAS,* 105(51) 20136-20140 (2008), the disclosure of which is incorporated herein by reference.) Specifically, by modifying the alloys' composition and density, while balancing the volume fractions of metallic glass matrix and dendrites, Hofmann et al. developed a family of Ti—Zr—V—Cu—Be BMGMCs (the DV-DVAl family) with different dendrite volume fractions, wherein DV4, DVAl1 and DVAl2 all have >60% BCC dendrites (FIG. 2A). The resulting alloys were not only amenable to cooling into billets larger than 1 cm thick (FIG. 2B), but also possessed a host of enhanced mechanical properties, as compared to traditional crystalline alloys such as Ti-6Al-4V (FIGS. 2C and 2D). Specifically, the alloys demonstrated yield strength of up to 1,600 MPa, total strain to failure in tension of 12.5%, maximum specific strength of 315, density between 4.97-5.15 g/cm$^3$, and fracture toughness greater than 60 MPa m$^{1/2}$. Notably, all of these alloys had a density of less than 6 g/cm$^3$, which is the upper limit for crystalline Ti-based alloys used commonly. In addition, these prior art Ti-based BMGMCs had higher fatigue limits than Ti-6Al-4V (FIG. 2E), as well as a higher strength, specific strength, and fracture toughness. Moreover, the alloys had a solidus temperature that was approximately half that of conventional Ti-6-4 alloys (~650° C.), which make them amenable to processing via die casting or injection molding. In addition, these enhanced alloys exhibited exceptional glass forming ability (GFA) and could be made with an amorphous matrix in thicknesses approaching one inch.

Figure 3A:
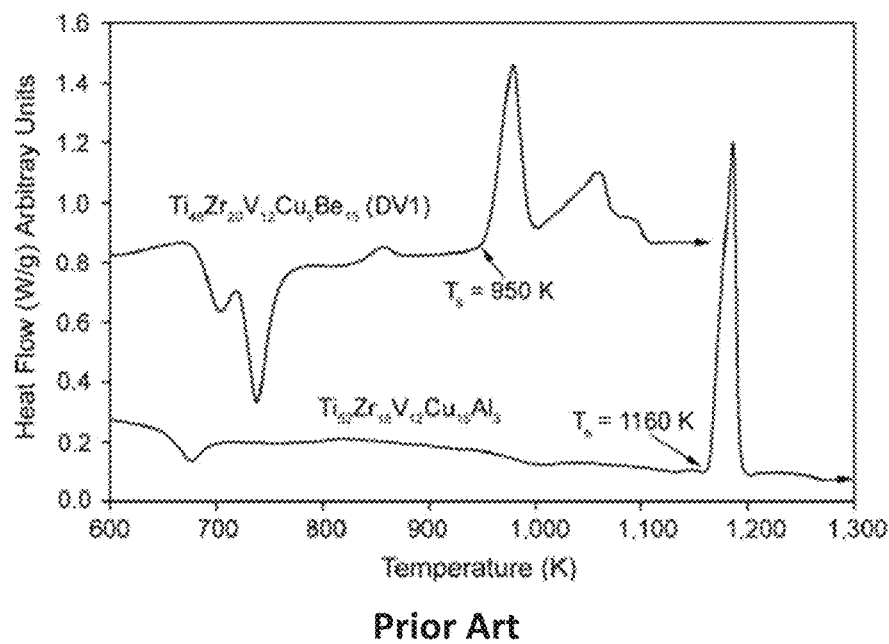
FIGS. 3A and 3B provide a heat flow data graph (FIG. 3A), and images of cast parts (FIG. 3B) of Zr and Ti-BMGMCs in accordance with the prior art.
Figure 3B:
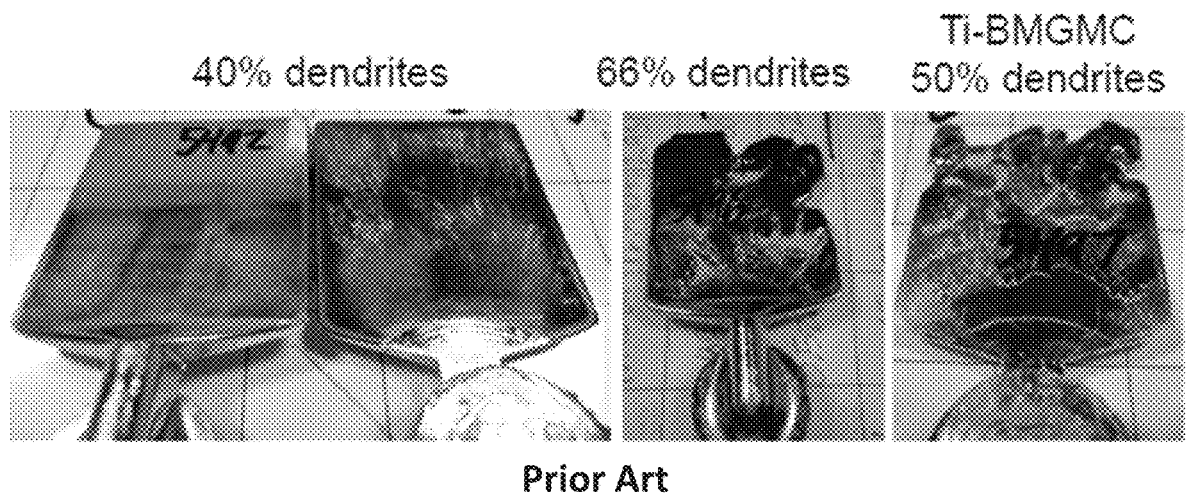

However, while Ti-based BMGMCs and UFGMCs both have some advantages (e.g., impart high strength to the composite), their use is not widespread due to problems associated with alloy formulation and manufacturing. For example, as shown in the tables and associated graphs, many Ti-based BMGMCs, such as those disclosed by Hofmann, contain beryllium in amounts of between 5-20 atomic % (0.9-3.4 weight %), which is highly undesirable due to its toxicity (FIG. 2C). However, Be is necessary for phase separation of the dendrites, due to its low solubility in beta titanium, and for good glass forming ability of the alloys, as well as for many other desirable properties. In addition, removing Be dramatically increases the melting temperature of the alloy, making it difficult to cast. For example, FIG. 3A illustrates that substituting Be in alloy DV1 (FIG. 2C) for Al to form $Ti_{52}Zr_{18}V_{12}Cu_{15}Al_3$, while maintaining approximately the same high Ti—Zr—V presence (in total of 80 and 82 atomic % correspondingly) and the same dendrite volume fraction, increases the solidus temperature by 210 degrees, making the new Al-containing alloy barely castable and no longer amorphous. Furthermore, the casting of dendrite-containing alloys is, in general, very problematic because the alloy viscosity and melting temperature are too high for the production of good quality cast parts, often leading to mold damage from overheating (which is necessary to lower the viscosity). For example, FIG. 3B demonstrates the challenges associated with casting Ti-BMGMC alloys that have a dendrite volume fraction of more than 50%, including the increase in cast part defects or incomplete casts. Accordingly, the manufacturing of complex parts with desirable properties from BMGMC alloys with high dendrite concentrations remains unattainable with conventional die-casting or injection molding. An additional detracting feature of Ti-BMGMCs is their very low services temperatures. Since the alloys contain a glassy matrix, they can only be used in service up to a temperature near their glass transition, at which point the matrix would begin to flow. This happens at approximately 300 C with Ti-BMGMCs. In contrast, crystalline Ti alloys, like Ti-6-4 have services temperatures in excess of 500 C.

Figure 4A:
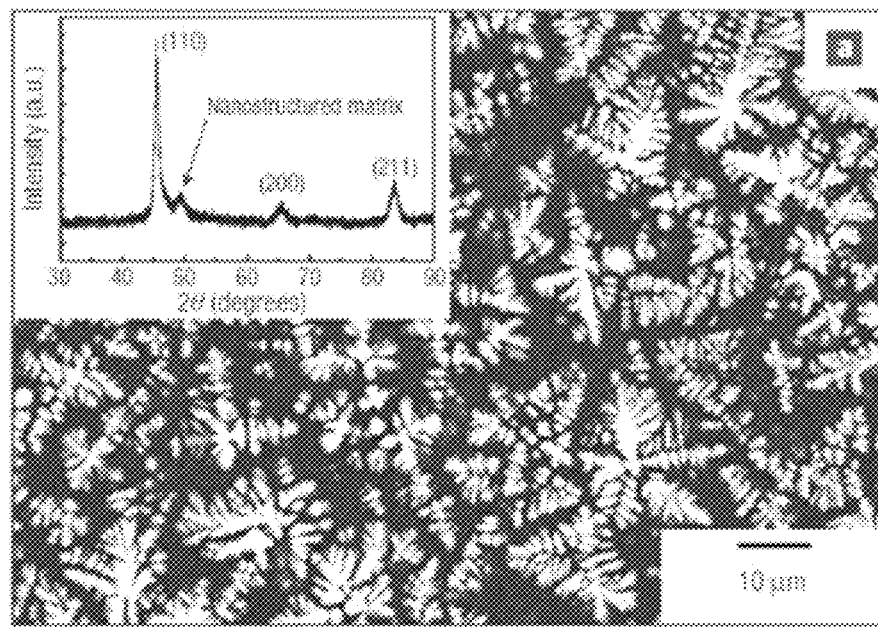
FIGS. 4A and 4B provide x-ray data and micrograph images (FIG. 4A and inset), and stress data (FIG. 4B) for Ti-UFGMCs in accordance with the prior art.
Figure 4B:
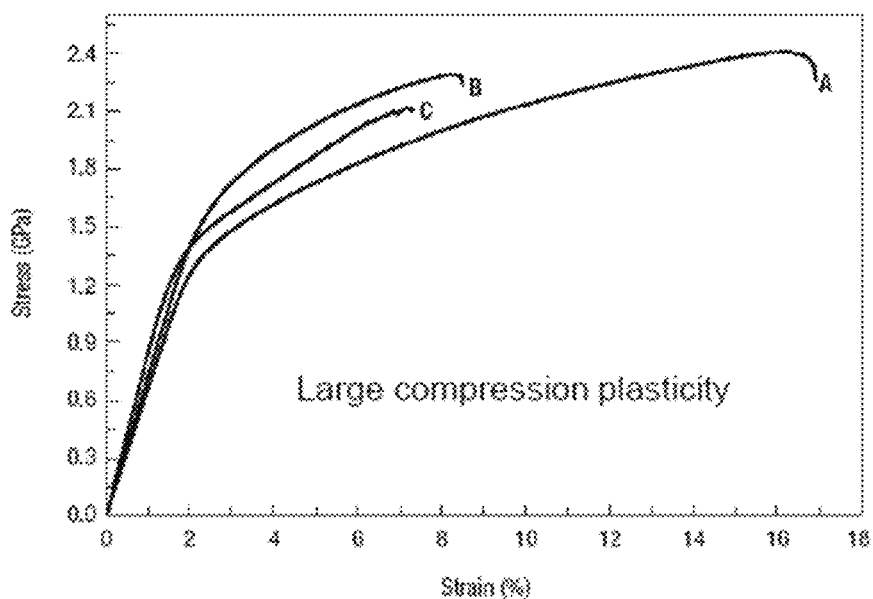

Various attempts have been made to achieve the excellent mechanical properties of BMGMCs in non-Be Ti-based UFGMCs. One prominent example of such attempts was reported by Shultz et. al., in Nature Materials 2002. Specifically, Shultz et. al., describe the development of a Ti—Ta/Nb—Sn—Cu—Ni UFGMC, wherein the composition of Ti-based BMG $Ti_{50}Cu_{23}Ni_{20}Sn_7$ (a poor glass former) was modified to include β stabilizing elements and have an increased Ti content, to create alloys $Ti_{60}Cu_{14}Ni_{12}Sn_4Ta_{10}$ and $Ti_{60}Cu_{14}Ni_{12}Sn_4Nb_{10}$. It was found that when these new compositions were cooled at a sufficiently fast rate, the achieved microstructure of the high-strength nanocrystalline matrix (see FIG. 4a) was reminiscent of the glassy microstructure of the Be-containing Ti-based BMGMCs. As such, these alloys exhibited high strength and good plasticity in compression (see FIG. 4b). However, their ductility in tension and bending is poor, due to the high brittleness of the UFG matrix.

Other attempts to form Ti-based BMGMCs involved increasing the Ti content in a Ti-based BMG to more than 65 atomic %. For example, Whang et. al. studied the high Ti-content $Ti_{84}Zr_{10}Si_6$ composition of the Ti—Zr—Si BMG family. (See, e.g., Whang et al., *J. of Materials Science Letters,* 4, 883-887 (1985), the disclosure of which is incorporated herein by reference). It was found that, upon solidification, rapidly quenched foils of this alloy possessed a 2-phase microstructure, comprising a crystalline phase dispersed in a nano-structured matrix. Notably, the 3-element alloy of Whang did not contain any β stabilizers for either softening the precipitating crystal phase or for improving its GFA. In another example, Lin et. al. developed an alloy within the same Ti—Zr—Si family—$Ti_{65}Zr_{10}Ta_{10}Si_{15}$, which formed a metallic glass upon rapid solidification. (See, e.g., Lin et al., *Intermetallics,* 2014, the disclosure of which is incorporated herein by reference). Here, although the addition of β stabilizing elements, such as Ta and Nb, did improve the alloy's GFA, the concurrent significant increase in the Si content counteracted some of the advantageous properties expected from BMGs. In particular, the focus on forming the materials into BMGs capable of casting means that the alloys show a brittleness and lack of strength not comparable with other Ti-based alloys.

Accordingly, Ti-based alloys that combine high strength and high toughness, yet do not contain Be and are easy to manufacture, remain elusive, since maximizing the strength and toughness properties via available methods, such as high-volume fraction dendrite MMCs, typically reduces the alloys' manufacturability via conventional casting or machining methods. Specifically, all attempts at improving the mechanical properties of Ti-based alloys reported to date, including via the BMGMC and UFGMC approaches, have been severely restricted by the requirement that, in order to be practical, the resulting alloys must remain amenable to casting into net-shapes or to machining, which, in turn, has dictated the acceptable (relatively low) alloy viscosities and melting temperatures.

Embodiments of Ti-Based MMCs

The current application is directed to embodiments of methods and alloy systems for developing Ti-based alloy metal matrix composite compositions with superior mechanical properties, especially high toughness and strength. As discussed above, to date, the development of Ti-based MMCs (whether BMGMC or UFGMC) has primarily been restricted by the requirement that they are amenable to casting, and, therefore, efforts have focused on the alloys with <50% dendrites by volume and with <85% sum total of Group 4-6 metals (e.g. Ti, Zr, Nb, Ta, Hf, Mo, V). However, as also discussed above, the alloys obtained under such restrictions tend to be brittle, as their microstructures do not arrest the development of fatal cracks. Accordingly, alloys of embodiments are directed to MMC materials comprising a soft crystalline metal dendrite phase dispersed throughout a continuous high strength crystalline eutectic matrix phase (e.g., at least 5% harder than the dendrite phase) in sufficient concentration capable of resisting fracture.

The deficiency, in prior art attempts to arrest fracturing relates to the nature of crack propagation and the interaction of the propagating crack with the dendritic phase. As shown in the schematic provided in FIGS. 5A and 5B, a Ti-based MMC alloy generally comprises at least two phases: a soft crystalline metal Ti-dendrite phase (shown by the circles and voids) dispersed throughout a continuous high strength matrix phase. It has been shown that a certain minimum dendrite amount/volume fraction is required in the solidified alloy in order to achieve the desired crack suppression effect and, as a result, to minimize brittleness and acquire satisfactory ductility. For example, it has been shown that for Be-containing BMGMCs the dendrite volume fraction must be ~60% or above in order for the alloy's properties to be "casting invariant." In other words, rapidly quenched BMGMC alloys will have roughly the same ductility as large ingots of the material. (See, e.g., the Table provided in FIG. 2C.)

Figure 6:
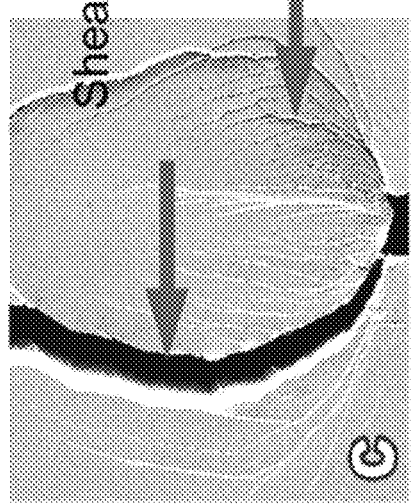
FIG. 6 provides a table showing fracture toughness and yield strength for materials in accordance with the prior art.
Figure 7A:
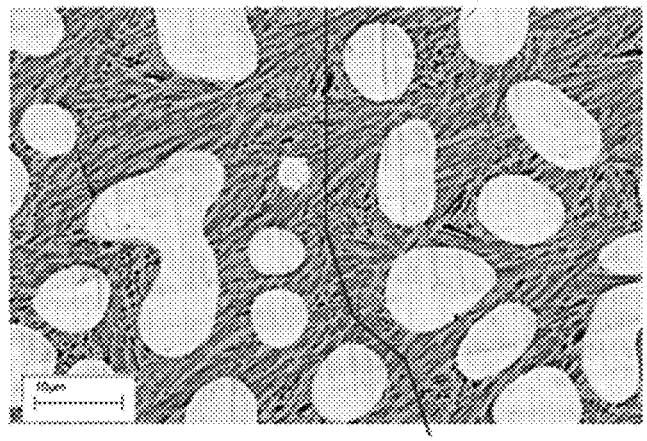
FIGS. 7A to 7C provide micrograph images of MCCs with varying dendrite concentrations in accordance with embodiments.
Figure 7B:
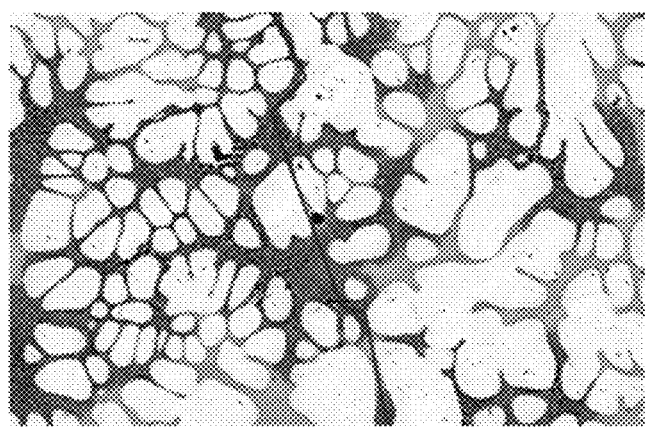
Figure 7C:
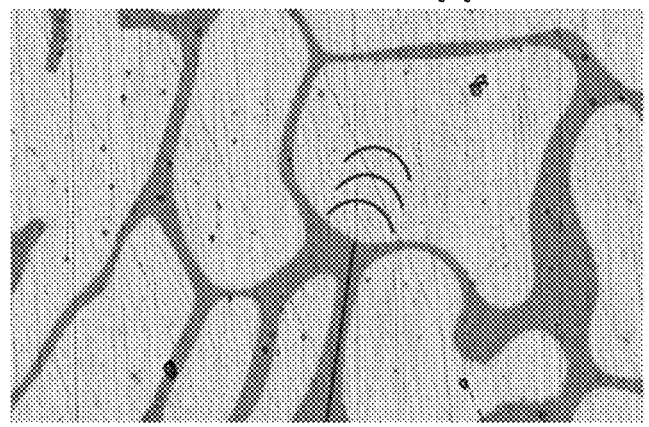

However, the ability to use dendritic concentrations as low as 60% by volume in BMGMCs is the result of the unique properties of metallic glasses and high toughness of their matrix (see, e.g., FIG. 6), which better resists fracturing and allows for the use of lower volume fractions of dendrites. By contrast, ultra-fine or nano-grained (e.g., eutectic) MMCs, such as those provided in embodiments, are far more brittle than that of BMGMCs, and, therefore, require a larger volume fraction of dendrites. This is also true if the grain size of the matrix is enlarged, through heat treating steps, which would form brittle phases with larger grains. Exemplary micrographs of crack propagation for different concentrations of dendrites in exemplary materials are provided in FIGS. 7A to 7C. As shown, at dendritic concentrations below 60% by volume (FIG. 7A), cracks propagate without difficulty through the brittle matrix. By contrast, at dendritic concentrations at and above 60% by volume (FIGS. 7B and 7C) crack propagation is impeded and stopped by the density of the dendritic phase. Accordingly, in various embodiments the Ti-based MMCs comprise a dendritic reinforced matrix wherein the dendritic phase upon solidification from melt comprises in many embodiments at least 60% by volume of the MMC, in various embodiments at least 70% by volume, in other various embodiments at least 80% by volume, and in still other various embodiments up to 98% by volume. It is important to note that Ti-MMC formed in-situ will still have a continuous matrix with as little as 2% matrix and 98% dendrites due to the physics of dendrite formation. This innovation allows the volume fraction of the dendrites to remain exceedingly large while still retaining a high strength, which is carried by the continuous matrix.

Figure 8:
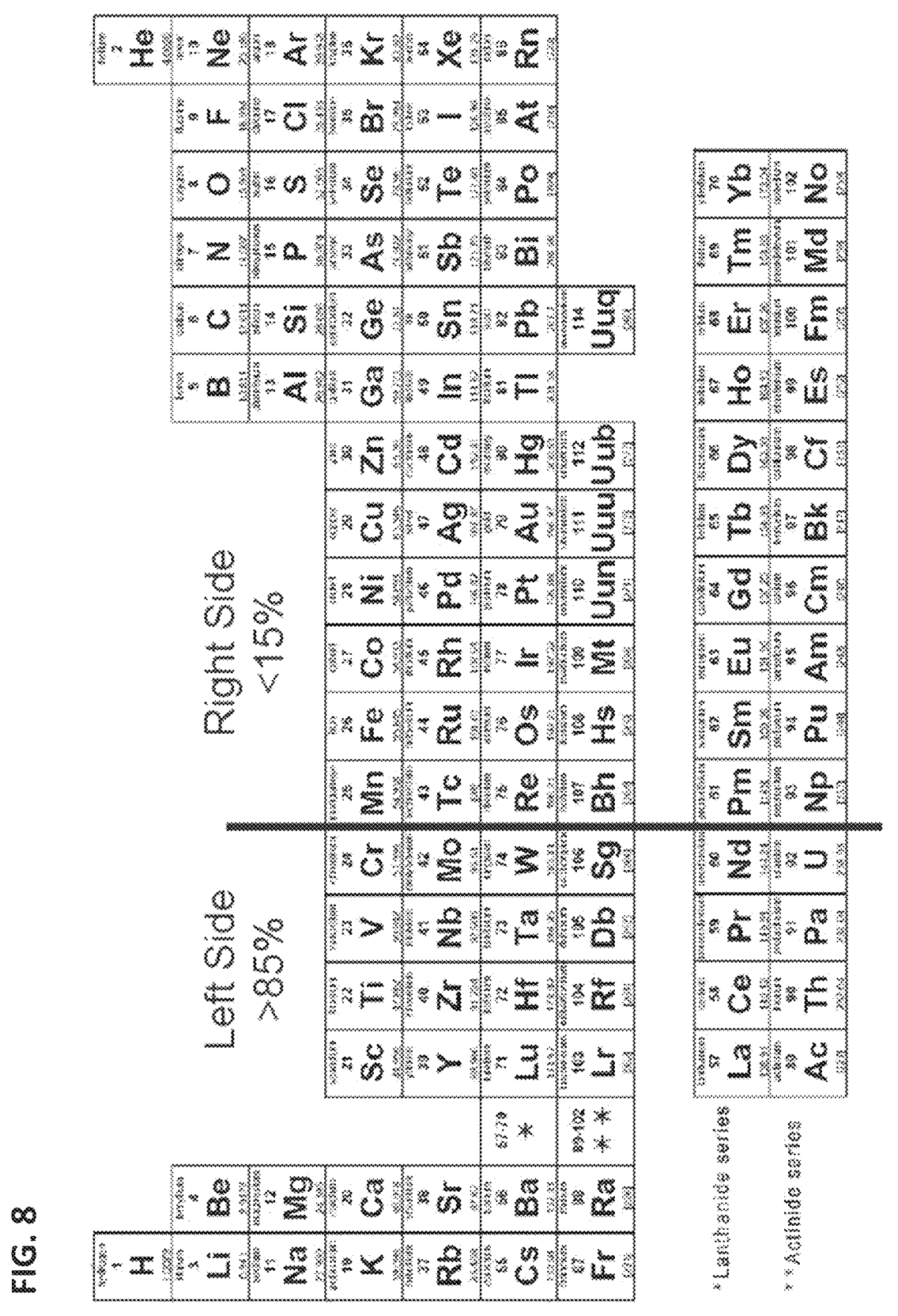

Obtaining Ti-based MMCs with high dendritic volumes according to embodiments, in turn, requires high combined concentrations of Ti and one or more β-stabilizers in the composition. In general terms this means maximizing the concentration of elements on the composition from left side of the periodic table (e.g., the early transition metals), at the expense of component elements from the right side of the periodic table (e.g., late transition metals). Accordingly, in many embodiments, the Ti-based MMCs formulated according to embodiments comprise a combined total of 85% of Ti and one or more β-stabilizers selected from the Group 4-6 metals, as shown schematically in FIG. 8. In many embodiments the combined compositional amount of Ti and β-stabilizers (including, in some embodiments, Zr) is between 85-98 atomic %. In many embodiments, the alloys with 85-98 combined atomic % of Ti and β-stabilizers afford a sufficient amount of dendrites to produce a Ti-alloy part with satisfactory ductility, strength, and toughness according to the methods of the application. In many embodiments, the relevant Group 4-6 metals are chosen from a list that includes, but is not limited to: titanium, zirconium, hafnium, tantalum, niobium, vanadium, molybdenum, and any combination thereof. In some embodiments, beta stabilizers include Zr and/or other Group 4 through 6 metals selected from the list above. In many such embodiments, β-stabilizers include at least Zr.

Figure 9:
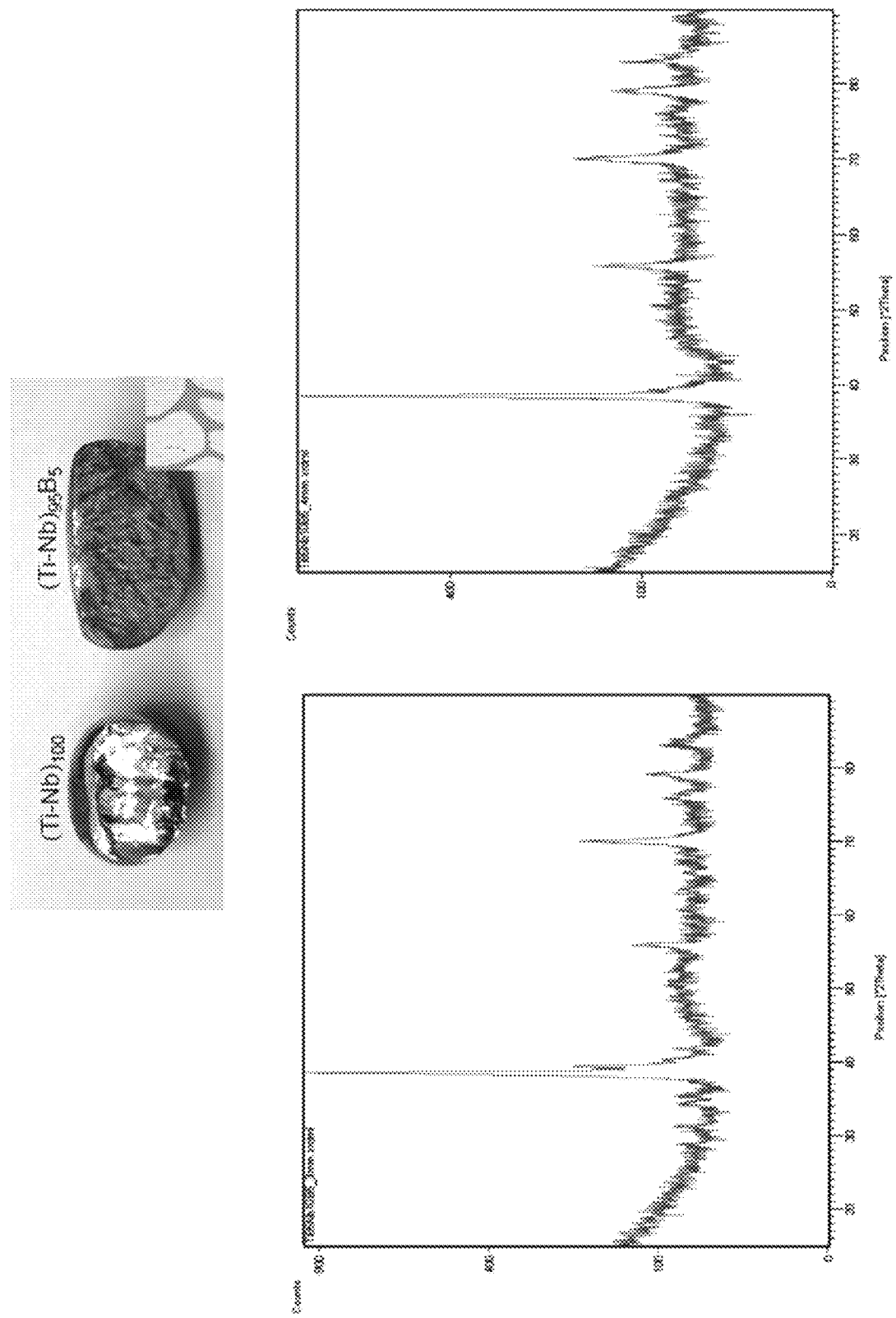
FIG. 9 provides images (top) of and x-ray crystal data for ingots formed using $Ti-Nb_{100}$ (left plot) and $Ti-Nb_{95}B_5$ (right plot) in accordance with embodiments.

In many embodiments, the remaining 2-15 atomic % of the alloy composition comprise elements that, together, have a very low solubility in the BCC phase of Ti, such that they form a second phase upon solidification from the melt. Typically, such element combinations can be determined from the relevant phase diagrams, but, in many embodiments, the acceptable elements are metalloids or late transition metals selected from the group comprising: B, Si, Co, Cu, Fe, Ni, Sn, Pd, Al. As an example, adding as little as 5 atomic % of low-solubility B turns a monolithic $(Ti-Nb)_{100}$ alloy into a 2-phase, dendrite-infused continuous matrix composite (as demonstrate by the crystalline Xray plots obtained for such alloys provided in FIG. 9). Accordingly, in many embodiments, a small amount (e.g., 2-15 atomic %) of one or more elements capable of affording phase segregation in Ti-alloys is included in the compositions of the instant application to reduce the alloy's overall melting temperature and ensure phase separation and dendrite production.

Note, although the above discussion has excluded Be, in principle, Be is also a suitable insoluble second phase former, and, together with other non-metals B and Si, represents the most potent group of second phase formers with a very low solubility in BCC Ti, as demonstrated by observing the solubility of these elements with Ti in binary phase diagrams. However, in many embodiment Be is excluded from all compositions of the instant application due to its toxicity and the problems it poses during manufacturing, especially with powder.

Figure 10A:
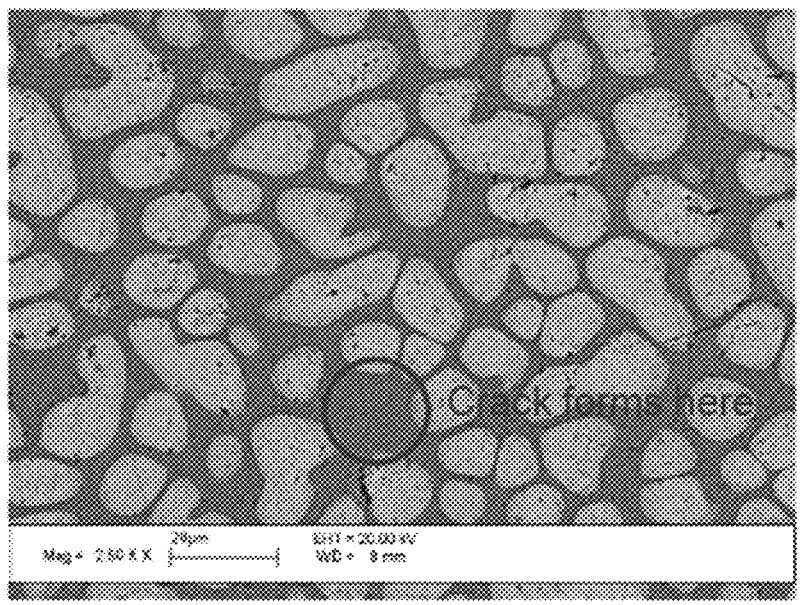
FIGS. 10A and 10B provide micrograph images showing dendrite size-scales for alloys having the same dendrite concentrations in accordance with embodiments.
Figure 10B:
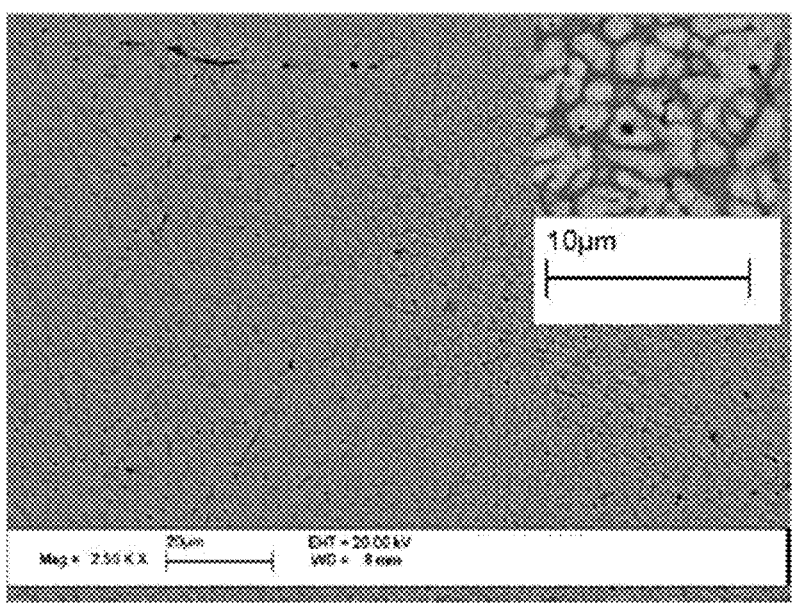

In addition to the volume concentration of dendrites in the Ti-based MMCs, the size-scale of dendritic microstructures may also be controlled to improve the properties of the materials according to embodiments. Specifically, FIGS. 10A and 10B provide micrograph images of the dendrites in two Ti-MMCs having the same concentration of dendrites (e.g., 66% by volume). However, in the Ti-based MMC shown in FIG. 10A the dendrites have a size-scale of around ~20 μm, while in FIG. 10B the dendrites have a size-scale of ~2 μm. These smaller size-scale dendrites according to embodiments can have a significant impact on the toughness of the materials and their susceptibility to fracture. In accordance with embodiments, smaller dendrites allow for closer packing and, ultimately for a higher volume fraction of dendrites in the alloy. In turn, smaller, tighter packed dendrites are more effective at arresting crack propagation that might plague the otherwise brittle matrices of MMCs, and, therefore, greatly enhance the alloy's strength and toughness. Accordingly, in many embodiments, the Ti-based MMC comprises an ultra-fine grained metallic matrix composite. In various embodiment, the dendrite size of such embodiments is less than 20 microns in diameter. In various other embodiments, the dendrite size is smaller than 10 microns in diameter. In still various other embodiments, the dendrite size is smaller than 5 microns in diameter.

Figure 11A:
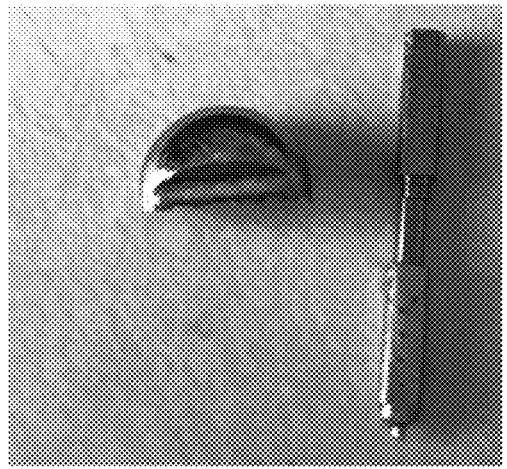
FIGS. 11A to 11C provide images (FIG. 11A) of ingots and a rod, and x-ray crystal data for the ingots (FIG. 11B) and rods (11C) in accordance with embodiments.
Figure 11B:
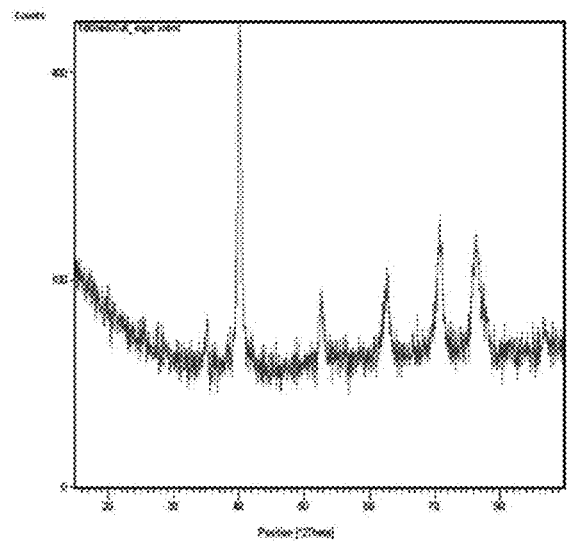
Figure 11C:
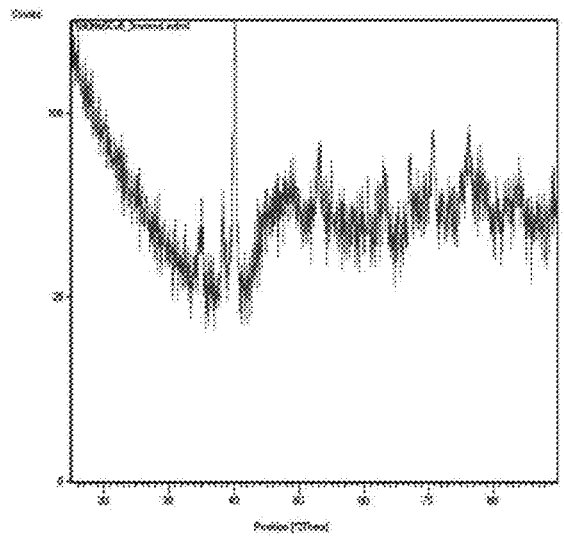

One method of obtaining Ti-based MMC incorporating smaller, more closes packed dendrites is to rapidly cool the material from the melt. Specifically, FIGS. 11A to 11C, illustrate how varying cooling rates can lead to different microstructures. To this end, FIG. 11A show images of an ingot and a 3 mm rod both formed using a the same Ti-based MMC. However, in order to form the rod, the cooling rate on solidification from the melt is increased as a result of the smaller cross-section. As shown in FIGS. 11B and 11C, this change in cooling rate has a significant impact on the microstructure of formed pieces. Specifically, x-ray scans for the two pieces show that the slower cooled piece shows much more intense crystalline peaks indicating larger dendritic phases and larger grained eutectic (FIG. 11B), whereas the x-ray scans for the faster cooled rod shows less intense crystalline peaks indicating a more disordered structure and thus smaller dendritic phases and finer grained eutectic (FIG. 11C). This difference can also be observed in the physical properties of the parts formed using different cooling rates. For example, the ingot is soft and ductile, whereas the rod behaves as a high strength MMC. Accordingly, in many embodiments, cooling rates of at a sufficiently fast rate to afford a material comprising a matrix infused with ultra-high volume fraction of small dendrites. In some such embodiments, the cooling rate upon formation is least 1000 K/s.

In view of the discussion above, Ti-based MMCs in accordance with many embodiments include at least the following compositional features:

They are formulated to produce dendrite reinforced Ti-based metal matrix composites from alloys having high concentrations (e.g., 85% or more of two or more) of Group 4-6 metals. In some such embodiments, the concentration of Ti in the composition is at least 50%. In various such embodiments, the composition further comprises form from 2 to 15% of a component having poor BCC solubility, including, for example, B, Si, Co, Cu, Fe, Ni, Sn, Pd, Al.

The MMC's incorporate dendrites in high concentrations (e.g., at least 60% by volume, and in some embodiments up to 98% by volume).

In various embodiments, the dendrites are small, wherein the diameter of a single dendrite is less than 20 micrometer.

Although specific compositions and combinations of materials are described above, it will be understood that other combinations of materials and concentrations may be used to form Ti-based MMCs without departing from embodiments of the invention.

Embodiments of Additive Manufacturing Methods for Fabricating Ti-Based MMC Parts As discussed above, Ti-based MMCs in accordance with embodiments incorporate high concentrations of dendrites, however, as found by prior art studies an increased dendrite volume fraction also makes the alloys more viscous and significantly raises their melting temperature, making them more difficult to cast. Recently, metal additive manufacturing (AM) technology (also known as 3D printing) has made rapid advances in the fabrication of net-shaped parts from novel metal alloys. Typically, metal AM has been used to fabricate components from conventional crystalline metal alloys, such as titanium, steel, casting aluminum alloys, and Inconel. However, the rapid cooling rates inherent to many AM technologies have also allowed for the fabrication of metastable alloys, such as bulk metallic glasses (BMGs) and nanocrystalline metals. Specifically, cooling rates in excess of $10^3$ K s$^{-1}$ for each deposited layer have allowed thick, net-shaped components to be printed from alloys that have microstructures (or lack thereof) that cannot be cast or otherwise manufactured in bulk form.

As discussed above, high cooling rates are advantageous in the formation of Ti-based MMCs in accordance with embodiments. Accordingly, many embodiments are also directed to methods of forming objects that take advantage of the very fast rates of cooling afforded by 3D printing to form discrete thin layers to assemble bulk parts from the Ti-based MMC compositions according to embodiments. In many such embodiments, additive manufacturing may be used to fabricate parts of enhanced strength and toughness, wherein each deposited layer of the alloy composition formulated according to the methods of the application is cooled at the sufficiently fast rate to afford a material comprising a matrix infused with ultra-high volume fraction of small dendrites.

Figure 12:
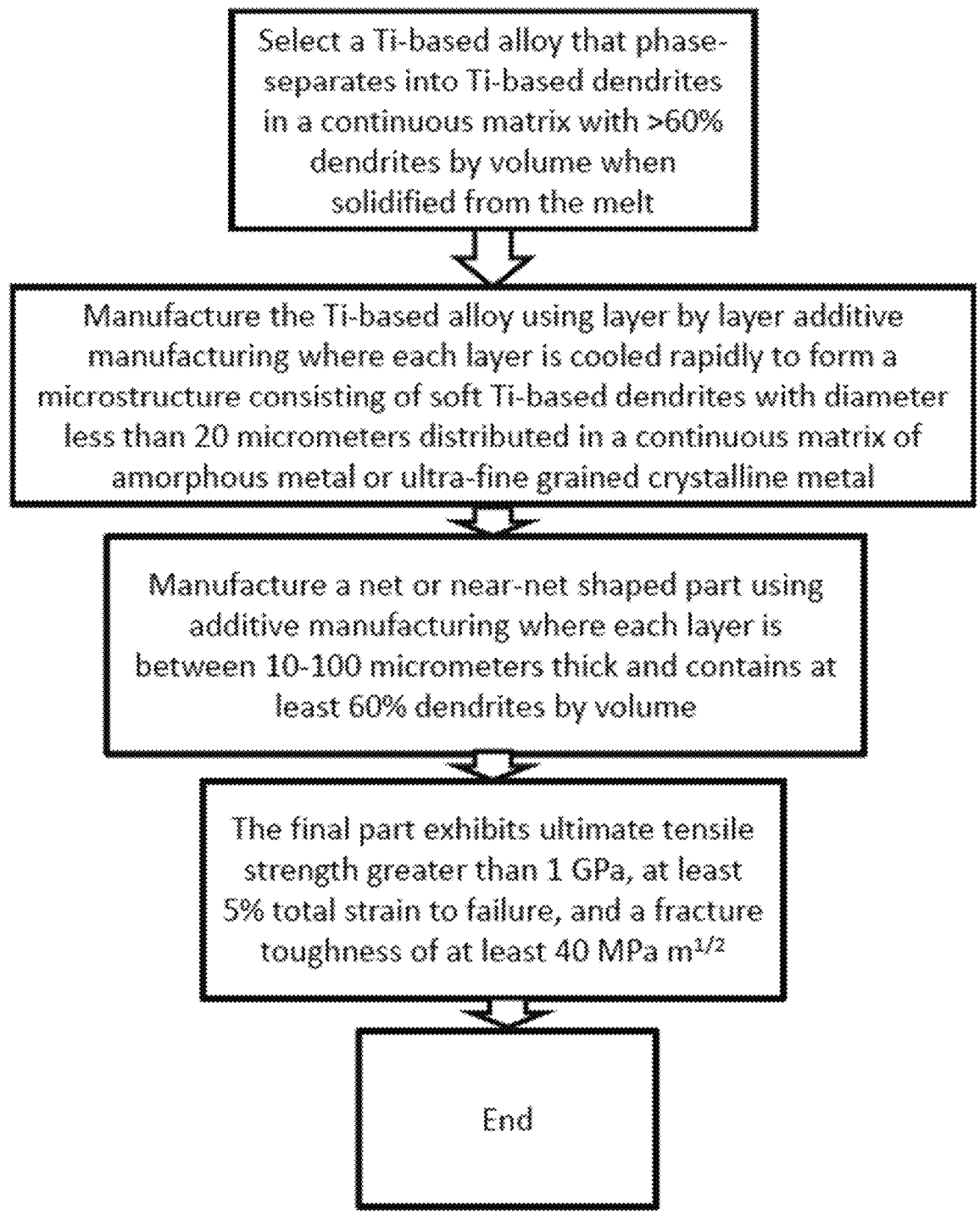
FIG. 12 provides a flowchart of a process for forming parts from Ti-based MMCs in accordance with embodiments.
Figure 13:
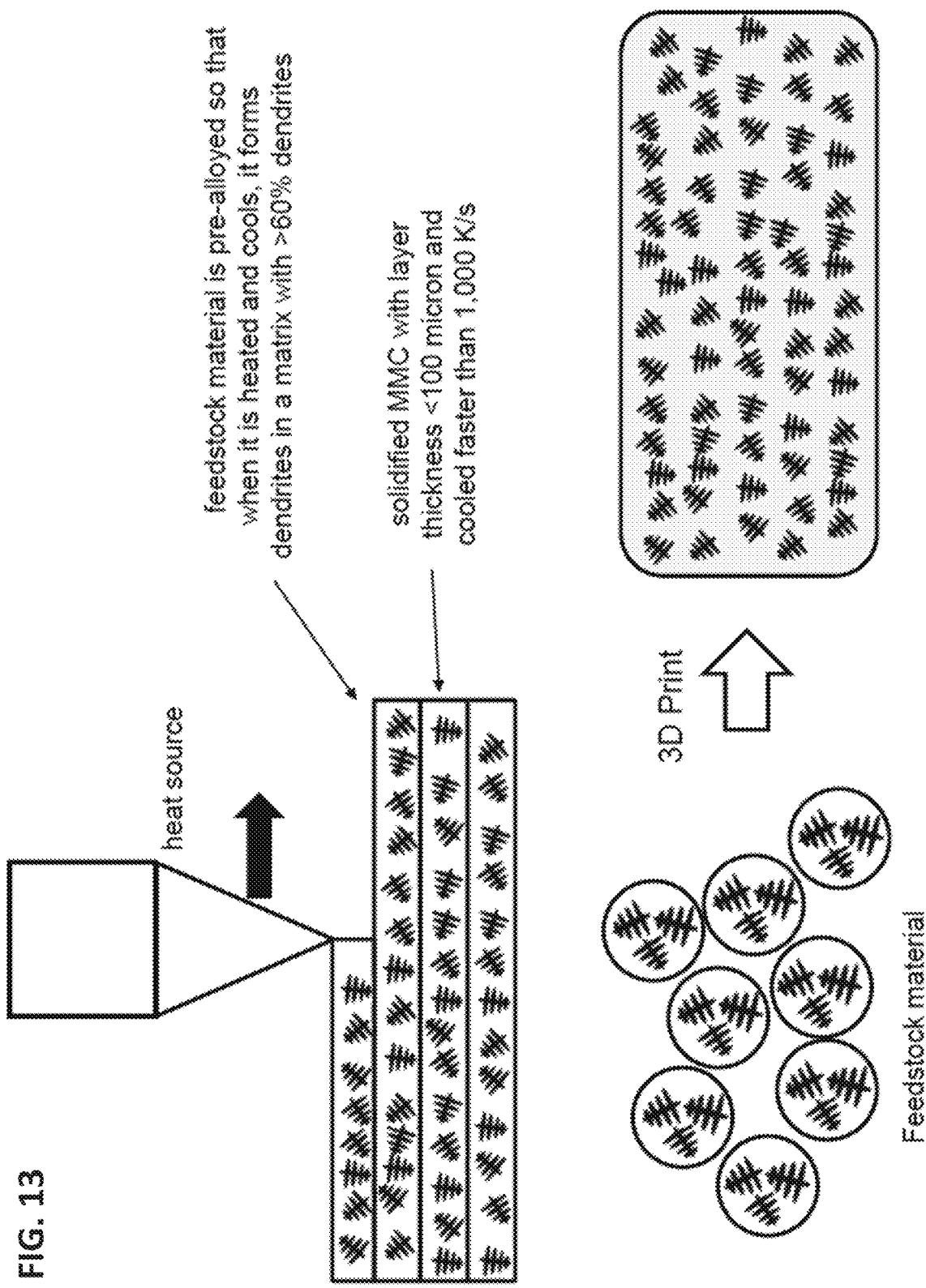
FIG. 13 provides a schematic of an additive manufacturing process in accordance with embodiments.

FIG. 12 provides a flowchart, and FIG. 13 a schematic of additive manufacturing (AM) methods in accordance with many embodiments. As shown and described, in many embodiments, parts may be manufactured from the Ti-based MMC compositions formulated according to the methods of the application in a layer by layer additive manufacturing process, wherein each layer has a sufficient volume fraction of soft Ti-based dendrites to obtain a three-dimensional part having desired properties. In some such embodiments the individual layers of the Ti-based MMC comprise at least 60% by volume of a soft dendrite phase in the high strength matrix. In various other embodiments, each layer is cooled rapidly enough to create a UFG matrix. In some such embodiments the UFG matrix incorporates dendrites with a size-scale of less than 20 μm. Although various deposition and manufacturing parameters may be used, in many embodiments the thickness of each layer being deposited and cooled during the AM process according to the methods of the application is from 10 to 100 micrometers to ensure a 100 to 1,000 K/s or higher cooling rate per layer.

In many embodiments, the feedstock for 3D printing is pre-alloyed, so as to, upon solidification of the deposited layer, form the appropriate size Ti-dendrites dispersed within the composite's matrix in a sufficient volume fraction. Forming the alloys in accordance with embodiments may be done in situ in the melt, or ex situ, where a hard Ti alloys is combined with the soft Ti components to form a composite. In some such embodiments the hard and soft Ti materials may be provided in the form of powders with a size distribution within 10% of each other. In other such embodiments, the different Ti feedstocks may have different melting temperatures such that during disposition of the metallic glass forming alloy melts and the crystalline phase at most partially melts. In many embodiments, wherein full or partial melting of the material occurs during deposition, Ti-based MMCs of the application are cooled rapidly from above the solidus temperature. In such embodiments, the substrate being built becomes a heat-sink, allowing for cooling rates exceeding 100 to 1,000 K/s to be achieved in each layer. In many embodiments, such high cooling rates are sufficient to form the matrix of the Ti-based MMC into either a metallic glass or an ultra-fine grained alloy, but are also slow enough to allow dendrite precipitation. In many embodiments, additive manufacturing methods of the application afford sufficient cooling rates to fabricate parts with thicknesses exceeding the feedstock alloys' critical casting dimensions. In many embodiments the additive manufacturing technique of the method is selected from a group that includes (but is not limited to): powder bed fusion, direct energy deposition, laser foil welding, thermal spray additive manufacturing, binder jetting, liquid deposition, wire arc additive manufacturing, fused filament fabrication, cold spraying, any combination thereof.

Although most metal additive manufacturing techniques are high temperature methods that melt (or at least partially melt) the material during deposition, cold metal 3D printing methods also exit. Accordingly, in some embodiments, the alloys formulated according to the methods of the application may also be used with the low temperature additive manufacturing techniques chosen from a list that includes, but is not limited to: binder jetting, ultrasonic welding, friction stir additive manufacturing, or cold spraying. In such embodiments, the feedstock material is manufactured in such a way as to achieve the high cooling rate required to form the UFG matrix. In many such embodiments, the feedstock alloy is provided in the form of one of: metal injection molding powder, spray atomized powder, ribbon, or wire.

In many embodiments, additive manufacturing techniques are used to create complex net shapes from the Ti-based MMC alloys of the instant application that cannot be otherwise conventionally cast or machined. In many embodiments, additive manufacturing is used with alloys formulated according to the methods of the application to afford UFGMCs or BMGMCs upon layer solidification from the melt. In many embodiments, the properties of the resulting parts exceed those of conventional crystalline titanium alloys. In many embodiments, the Ti-alloy part fabricated according to the methods of the application exhibits an ultimate tensile strength of greater than 1 GPa, a total strain to failure of at least 5% or more, and a fracture toughness of at least 40 MPa m$^{1/2}$. In many embodiments, Ta and Nb elements in the alloy composition, if any, are replaced with low-density V to achieve a density of less than 5.1 g/cm$^3$.

Accordingly, the systems and methods of the application are compatible with most additive manufacturing techniques and are very versatile in their ability to build a net-shaped part with a host of high-performance properties. In addition, in many embodiments, the UFGMC alloys of the application (which have more heat resistant phases than BMGMC alloys) are heat treated post production in order to reduce their porosity and/or improve other properties. Typically, heat treatment of UFFGMCs causes grain growth within the alloy's matrix, which, in turn, negatively affects their mechanical properties. However, in many embodiments, the significant presence (i.e. high volume fraction) and tight packing of the dendrites in the UFGMC alloys prepared according to the methods of the application counteract the detrimental effects of the heat treatment.

EXEMPLARY EMBODIMENTS

The following examples are set forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

Example 1. Representative Alloy Compositions for Additive Manufacturing of Parts In many embodiments, exemplary compositions, such as, $Ti_{74}Ta_{10}Zr_{10}Si_6$ and $Ti_{75}Cu_7Ni_6Sn_2Ta_{10}$ represent alloys suitable for the additive manufacturing methods of the application. Specifically, both of these alloys comprise a sufficient amount of Ti and β-stabilizers (94 and 85 atomic %, correspondingly), which, in turn, ensures the sufficient volume fraction of dendrites (≥60%) in their microstructure upon solidification from the melt. Such high dendrite content prevents these alloys from easy casting, however, they can be used in 3D printing methods of the application to afford tough parts of any complexity.

Example 2. Representative Alloy Compositions for Additive Manufacturing of Low Density Parts In many embodiments, exemplary compositions, such as, $Ti_{74}V_{10}Zr_{10}Si_6$ and $Ti_{75}Cu_7Ni_6Sn_2V_{10}$ represent low density alloys suitable for the additive manufacturing methods of the application. In these compositions, Ta element of the compositions from Example 1 above is replaced with V element, lowering the resulting alloys' densities to 4.9 and 5.1 g/cm$^3$ respectively. Notably, additions of Al and/or B can lower the alloy density even further. Accordingly, in many embodiments, the low density, high strength alloys composed according to the methods of the application are used with additive manufacturing methods of the application to produce parts with excellent specific strengths.

Example 3. Importance of High Cooling Rates for Formation of Ti-based MMCs

In many embodiment, exemplary compositions, such as, $Ti_{90}Nb_5Cu_5$ alloy may be used through a rapid cooling manufacturing process, such as, AM to form parts having smaller, tighter packed dendrite microstructure. In accordance with such embodiments, high strength MMCs parts may be produced from the alloys known to afford soft and ductile cast parts, when used according to the methods of the application.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of additively manufacturing a part comprising a metal composite material comprising:
providing an alloy comprising Ti; at least one β-stabilizer, wherein a β-stabilizer is an element selected from the group consisting of Zr, Hf, Ta, Nb, V, Sn, and Mo; and X, wherein X represents one or more additional elements selected from the group consisting of Co, Fe, Ni, Cu, Al, B, Ag, Pd, Au, C, and Si; wherein the atomic % of Ti in the alloy is greater than the amount of any other element in the alloy, wherein the combined amounts of Ti and the at least one β-stabilizer comprise at least 85 atomic % of the alloy; and wherein the alloy does not contain Be;
additively depositing a plurality of molten layers comprising the alloy atop one another;
cooling each layer of the plurality of molten layers prior to depositing a layer atop thereof at a cooling rate such that upon solidification the alloy segregates phases to produce a metal matrix composite comprising a plurality of isolated crystalline dendrites characterized by a dendrite size and a dendrite density dispersed within a continuous crystalline eutectic material matrix; and repeating depositing and cooling steps to form a metal matrix composite part with a thickness of at least 0.5 mm.

2. The method of claim 1, wherein the alloy comprises Ti, Zr, at least one additional beta-stabilizer, and X; and wherein the atomic % of the sum of Ti, Zr, and the at least one additional beta-stabilizer comprises between 85 and 98 atomic % of the alloy, and X comprises from 2 and 15 atomic % of the alloy.

3. The method of claim 2, wherein the at least one additional beta-stabilizer is selected from the group consisting of V, Nb, Ta, and Mo.

4. The method of claim 1, wherein Ti comprises at least 50 atomic % of the alloy.

5. The method of claim 1, wherein the alloy comprises Ti, one or both Zr and Hf, at least one additional beta-stabilizer, B, and at least one additional X; wherein the sum of Ti, the one or both Zr and Hf, and the at least one additional beta-stabilizer comprises between 85 and 98 atomic % of the alloy, B comprises between 0.5 and 5 atomic % of the alloy, and X comprises less than 10 atomic % of the alloy.

6. The method of claim 5, wherein the at least one additional beta-stabilizer is selected from the group consisting of V, Nb, Ta and Mo, and the at least one additional X is selected from the group consisting of Si, Cu, Co, Fe, and Pd.

7. The method of claim 1, wherein each layer of the plurality of molten layers is characterized by a thickness of between 10-1000 micrometers.

8. The method of claim 1, wherein the cooling rate is greater than $10^2$ K/s.

9. The method of claim 1, wherein the plurality of isolated crystalline dendrites comprises at least 60% by volume of the solidified alloy.

10. The method of claim 1, wherein the continuous crystalline eutectic material matrix is characterized by a matrix hardness and the plurality of isolated crystalline dendrites is characterized by a dendrite hardness, and wherein the matrix hardness is at least 5% larger than the dendrite hardness.

11. The method of claim 1, wherein the metal matrix composite part has at least one property selected from the group consisting of: a tensile strength of greater than 1 GPa, a fracture toughness of greater than 40 MPa m$^{1/2}$, a density of less than 6.0 g/cm$^3$, a total strain to failure of greater than 5% in a tension test, and a yield strength divided by the density greater than 200 MPa cm$^3$/g.

12. The method of claim 1, wherein the alloy is characterized by a solidus temperature of less than 1600 Celsius.

13. The method of claim 1, wherein the dendrite size ranges from 1 to 20 micrometers in diameter.

14. The method of claim 13, wherein the dendrite size is less than 10 micrometers in diameter.

15. The method of claim 1, wherein additively depositing further includes heating the alloy to a semi-solid temperature region between the alloy's solidus and liquidus prior or during a layer deposition.

16. The method of claim 1, wherein the metal matrix composite part is used in a structural application.

17. The method of claim 1, wherein additively depositing further comprises adjusting deposition parameters including a deposition temperature and or the cooling rate between depositing at least two adjacent layers of the plurality of molten layers, such that the dendrite size or the dendrite density within the at least two adjacent layers differs and a gradient of properties is created within the metal matrix composite part.

18. The method of claim 1, wherein additively depositing is a process selected from the group consisting of: powder bed fusion, direct energy deposition, laser foil welding, fused filament fabrication, electron beam fabrication, thermal spraying, and liquid deposition.

19. The method of claim 1, where the alloy comprises Ti, Nb and from 2 to 15 atomic % B.

20. The method of claim 19, wherein the concentration of B is 5 atomic %.

21. The method of claim 1, wherein the alloy is selected from the group consisting of $Ti_{74}V_{10}Zr_{10}Si_6$, $Ti_{64}V_{10}Zr_{20}Si_6$, $Ti_{71}V_{10}Zr_{10}Si_6Al_3$, $Ti_{74}Nb_{10}Zr_{10}Si_6$, $Ti_{74}Ta_{10}Zr_{10}Si_6$, $Ti_{75}Cu_7Ni_6Sn_2V_{10}$, $Ti_{75}Cu_7Ni_6Sn_2Nb_{10}$, $Ti_{75}Cu_7Ni_6Sn_2Ta_{10}$, $(Ti_{72}Zr_{22}Nb_6)_{95}Co_5$, $(Ti_{72}Zr_{22}Nb_6)_{92}Co_5Al_3$, $(Ti_{72}Zr_{22}Ta_6)_{95}Co_5$, $(Ti_{72}Zr_{22}Ta_6)_{92}Co_5Al_3$, $(Ti_{72}Zr_{22}V_6)_{95}Co_5$, $(Ti_{72}Zr_{22}V_6)_{92}Co_5Al_3$, $Ti_{90}Nb_5Cu_5$, $Ti_{85}Nb_{10}Cu_5$, $Ti_{80}Nb_5Cu_{10}$, $Ti_{80}Nb_{10}Cu_{10}$, $Ti_{90}Ta_5Cu_5$, $Ti_{85}Ta_{10}Cu_5$, $Ti_{80}Ta_5Cu_{10}$, $Ti_{80}Ta_{10}Cu_{10}$, $Ti_{90}V_5Cu_5$, $Ti_{85}V_{10}Cu_5$, $Ti_{80}V_5Cu_{10}$, $Ti_{80}V_{10}Cu_{10}$, $Ti_{85}V_{10}B_5$, $Ti_{85}Ta_{10}B_5$ and $Ti_{85}Nb_{10}B_5$, $Ti_{57}Zr_{18}V_{12}Cu_{10}Al_3$ or $Ti_{62}Zr_{18}V_{12}Cu_5Al_3$.

22. The method of claim 1, wherein the metal matrix composite part is a type of a part selected form the group consisting of: biomedical implant, structural aerospace component, sporting equipment, medical device, and engine component.

23. A method of additively manufacturing a metal composite part comprising:
  providing a metal composite material comprising:
    an alloy comprising Ti; at least one β-stabilizer, wherein a β-stabilizer is an element selected from the group consisting of Zr, Hf, Ta, Nb, V, Sn, and Mo; and X, wherein X represents one or more additional elements selected from the group consisting of Co, Fe, Ni, Cu, Al, B, Ag, Pd, Au, C, and Si; wherein the atomic % of Ti in the alloy is greater than the amount of any other element in the alloy, wherein the combined amounts of Ti and the at least one β-stabilizer comprise at least 85 atomic % of the alloy; and wherein the alloy does not contain Be; wherein
    the alloy is segregated into phases comprising a plurality of isolated crystalline dendrites dispersed within a continuous crystalline eutectic material matrix
  additively depositing a plurality of layers comprising the metal composite material atop one another via a cold deposition process selected from the group consisting of: binder jetting, friction stir additive manufacturing, cold spraying, and ultrasonic additive manufacturing to form a metal matrix composite part with a thickness of at least 0.5 mm.

* * * * *